(12) United States Patent
Zhang et al.

(10) Patent No.: US 9,729,371 B2
(45) Date of Patent: *Aug. 8, 2017

(54) ORTHOGONAL FREQUENCY DIVISION MULTIPLEXING (OFDM) SYMBOL FORMATS FOR A WIRELESS LOCAL AREA NETWORK (WLAN)

(71) Applicant: MARVELL WORLD TRADE LTD., St. Michael (BB)

(72) Inventors: Hongyuan Zhang, Fremont, CA (US); Sudhir Srinivasa, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 8 days.

This patent is subject to a terminal disclaimer.

(21) Appl. No.: 14/679,547

(22) Filed: Apr. 6, 2015

(65) Prior Publication Data

US 2015/0215146 A1    Jul. 30, 2015

Related U.S. Application Data

(63) Continuation of application No. 14/033,120, filed on Sep. 20, 2013, now Pat. No. 9,001,908, which is a
(Continued)

(51) Int. Cl.
*H04L 27/26* (2006.01)
*H04L 29/06* (2006.01)
(Continued)

(52) U.S. Cl.
CPC ........ *H04L 27/2626* (2013.01); *H04L 5/0023* (2013.01); *H04L 5/0044* (2013.01);
(Continued)

(58) Field of Classification Search
None
See application file for complete search history.

(56) References Cited

U.S. PATENT DOCUMENTS

| 7,599,332 B2 | 10/2009 | Zelst et al. |
| 7,742,390 B2 | 6/2010 | Mujtaba |

(Continued)

FOREIGN PATENT DOCUMENTS

| WO | WO-2011/014685 A2 | 2/2011 |
| WO | WO-2012/003355 A1 | 1/2012 |
| WO | WO-2012/122119 A1 | 9/2012 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

(Continued)

*Primary Examiner* — Hassan Phillips
*Assistant Examiner* — Saba Tsegaye

(57) ABSTRACT

In a method of generating an orthogonal frequency division multiplexing (OFDM) symbol, a plurality of information bits is encoded to generate a plurality of coded bits. The plurality of information bits corresponds to a first bandwidth, while the OFDM symbol includes a number of data tones corresponding to a second bandwidth. The coded bits are mapped to a plurality constellation symbols. The constellation symbols are mapped to a first plurality of data subcarriers corresponding to a first portion of the OFDM symbol and to a second plurality of data subcarriers corresponding to a second portion of the OFDM symbol. A subset of data subcarriers in the first plurality of data subcarriers and in the second plurality of data subcarriers are set to one or more predetermined values. The OFDM symbol is then (Continued)

generated to include at least the first plurality of data subcarriers and the second plurality of data subcarriers.

20 Claims, 11 Drawing Sheets

Related U.S. Application Data continuation-in-part of application No. 13/174,186, filed on Jun. 30, 2011, now Pat. No. 9,025,681.

(60) Provisional application No. 61/703,593, filed on Sep. 20, 2012, provisional application No. 61/360,828, filed on Jul. 1, 2010.

(51) Int. Cl.
*H04L 5/00* (2006.01)
*H04L 1/00* (2006.01)
*H04W 84/12* (2009.01)

(52) U.S. Cl.
CPC .......... *H04L 5/0046* (2013.01); *H04L 5/0048* (2013.01); *H04L 27/2602* (2013.01); *H04L 29/0653* (2013.01); *H04L 1/0042* (2013.01); *H04L 5/0064* (2013.01); *H04W 84/12* (2013.01)

(56) References Cited

U.S. PATENT DOCUMENTS

| | | | |
|---|---|---|---|
| 8,155,138 B2 | 4/2012 | van Nee | |
| 8,289,869 B2 | 10/2012 | Sawai | |
| 8,526,351 B2 | 9/2013 | Fischer et al. | |
| 8,619,907 B2 | 12/2013 | Mujtaba et al. | |
| 8,724,720 B2 | 5/2014 | Srinivasa et al. | |
| 8,867,653 B2 | 10/2014 | Zhang et al. | |
| 9,001,908 B2 | 4/2015 | Zhang et al. | |
| 2009/0022242 A1* | 1/2009 | Waters | H04L 1/0041 375/299 |
| 2009/0196163 A1 | 8/2009 | Du | |
| 2010/0046656 A1 | 2/2010 | van Nee et al. | |
| 2010/0260159 A1 | 10/2010 | Zhang et al. | |
| 2011/0002219 A1 | 1/2011 | Kim et al. | |
| 2011/0033004 A1* | 2/2011 | Wang | H04L 27/28 375/261 |
| 2012/0002756 A1 | 1/2012 | Zhang et al. | |
| 2012/0020423 A1 | 1/2012 | Reuven et al. | |
| 2014/0023156 A1 | 1/2014 | Zhang et al. | |

OTHER PUBLICATIONS

IEEE Std P802.11-REVma/06.0, (Revision of IEEE Std 802.11-1999) "Unapproved Draft Standard for Information Technology-Telecommunications and information exchange between systems-Local and metropolitan area network-Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11b-1999 (Supplement to ANSI/IEEE Std 802.11, 1999 Edition) "Supplement to IEEE Standard for Information technology—Telecommunications and information exchange between systems-Local and metropolitan area networks-Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems-Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology-Telecommunications and information exchange between systems-Local and metropolitan area networks-Specific requirements—Part 11: Wireless LAN Medium Access Control (MAC) and Physical Layer (PHY) specifications: Further Higher-Speed Physical Layer Extension in the 2.4 GHz Band, "The Institute of Electrical and Electronics Engineers, Inc., pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, pp. 1-69 (Apr. 2003).

IEEE P802.11n™/D3.00, "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11 n™ "IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.11ac/D2.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements

(56) References Cited

OTHER PUBLICATIONS for Very High Throughput for Operation in Bands below 6 GHz," *The Institute of Electrical and Electronics Engineers, Inc.*, pp. 1-363 (Mar. 2012).
IEEE Std 802.11af/D1.05 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).
Chen, "Home Network Basis: Transmission Environments and Wired/Wireless Protocols," *Prentice Hall*, pp. 1-26 (Jul. 2003).
de Vegt, "Potential Compromise for 802.11 ah Use Case Document", Institute of Electrical and Electronics Engineers, doc. No. IEEE 802.11-11/0457r0, pp. 1-27 (Mar. 2011).
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Hiertz, et al., "The IEEE 802.11 Universe," *IEEE Communications Magazine*, pp. 62-70, (Jan. 2010).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Kim, Joonsuk, et al., "Bits Consideration for SIGNAL fields," IEEE Draft, doc.: 802.11-10/0382r2, vol. 802.11ac, No. 2, 22 pages (May 18, 2010).
Mujtaba, S.A. "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).
Park, "IEEE 802.11ac: Dynamic Bandwidth Channel Access," 2011 IEEE Int'l Conf. on Communications (ICC), pp. 1-5 (Jun. 2011).
Park, "Proposed Specification Framework for TGah D9.x", *The Institute of Electrical and Electronics Engineers*, doc. No. IEEE 802.11-yy/xxxxr0, pp. 1-30 (Jul. 2012).
Park, "Proposed Specification Framework for TGah", *The Institute of Electrical and Electronics Engineers*, doc. No. IEEE 802.11-11/1137r11, pp. 1-36 (Sep. 2012).
Park, "Proposed Specification Framework for TGah", *The Institute of Electrical and Electronics Engineers*, doc. No. IEEE 802.11-11/1137r6, pp. 1-13 (Mar. 2012).
Perahia, et al., "Gigabit Wireless LANs: an overview of IEEE 802.11ac and 80211 ad," ACM SIGMOBILE Mobile Computing and Communications Review, vo. 15, No. 3, pp. 23-33 (Jul. 2011).
Shi et al., "Phase Tracking During VHT-LTF," Doc. No. IEEE 802.11-10/07711-0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Stacey, et al., "Proposed TGac Draft Amendment," IEEE P802.11—Wireless LANs, dock.: IEEE 802.11-10/1351r3, vol. 802.11ac, No. 3, 154 pages (Jan. 2011).
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
Taghavi et al., "Introductory Submission for TGah", doc. No. IEEE 802.11-11/0062r0, *Institute for Electrical and Electronics Engineers*, pp. 1-5 (Jan. 14, 2011).
van Nee, et al. "The 802.11n MIMO-OFDM Standard for Wireless LAN and Beyond," Wireless Personal Communications, vol. 37, pp. 445-453 (Jun. 2006).
van Zelst et al., "Pilot Sequence for VHT-DATA," Doc. No. IEEE 802.11-10/0811r1 , *The Institute of Electrical and Electronics Engineers, Inc.*, pp. 1-10 (Jul. 2010).
Vermani, et al. "Preamble Format for 1 MHz," *The Institute of Electrical and Electronics Engineers*, doc. No. IEEE 802.11-11/1482r2, pp. 1-30 (Nov. 2011).
Vermani, et al. "Spec Framework Text for PHY Numerology," *The Institute of Electrical and Electronics Engineers*, doc. No. IEEE 802.11-11/1311r0, pp. 1-5 (Sep. 2011).
Yu et al., "Coverage extension for IEEE802.11ah," *The Institute of Electrical and Electronics Engineers*, doc. No. IEEE 802.11-11/0035r1, pp. 1-10 (Jan. 2011).
Zhang et al., "11ac Explicit Sounding and Feedback", *The Institute of Electrical and Electronics Engineers*, doc. No. IEEE 802.11-10/1105r0, 44 pages (Sep. 2010).
Zhang et al., "11ah Data Transmission Flow," *The Institute of Electrical and Electronics Engineers*, doc. No. IEEE 802.11-11/1484r1, pp. 1-15 (Nov. 2011).
Zhang et al., "1MHz Waveform in Wider BW ", *The Institute of Electrical and Electronics Engineers*, doc. No. IEEE 802.11-12/0309r1, pp. 1-10 (Mar. 2012).
International Search Report and Written Opinion in International Application No. PCT/US2011/042650, dated Oct. 7, 2011.
International Search Report and Written Opnion in International Application No. PCT/US13/60929, dated Nov. 21, 2013.
International Preliminary Report on Patentability and Written Opinion for corresponding International Application No. PCT/US2011/042650, dated Jan. 17, 2013.
Communication regarding Examination Report in European Application No. 11 738 092.3-1860, dated Apr. 8, 2014 (6 pages).
First Office Action in Chinese Application No. 201180030232.6, dated Dec. 31, 2014, with English translation (16 pages).
Communication Pursuant to Article 94(3) EPC in European Application No. 11738092.3, dated Oct. 29, 2015 (5 pages).
U.S. Appl. No. 14/703,416, Zhang et al., "Modulation of Signal Field in a WLAN Frame Header," filed May 4, 2015.
Notice of Reasons for Rejection in Japanese Application No. 2013-518727, dated Jun. 30, 2015, with English translation (6 pages).
Second Office Action in Chinese Application No. 201180030232.6, dated Aug. 27, 2015, with English translation (6 pages).
International Preliminary Report on Patentability in International Application No. PCT/US2013/060929, mailed Apr. 2, 2015 (9 pages).
Search Report in European Patent Application No. 16177252.0, dated Oct. 5, 2016 (10 pages).
"TGn Sync—An IEEE 802.11n Protocol Standard Proposal Alliance—PHY Overview," IEEE 802.11n, Agere Systems, Inc. et al., 42 pages (Jun. 1 2004).
Mujtaba, "IEEE 802.11 Wireless LANs—TGn Synch Proposal Technical Specification," IEEE Draft, vol. 802.11n, No. 4, 164 pages (Mar. 5, 2005).
Communication Pursuant to Article 94(3) EPC in European Application No. 11738092.3, dated Oct. 28, 2016 (6 pages).
Office Action in Korean Patent Application No. 10-2012-7032299, dated Feb. 6, 2017, with English translation (12 pages).
Office Action in Chinese Patent Application No. 201380058169.6, dated Mar. 13, 2017, with English translation (16 pages).
Search Report in Chinese Patent Application No. 201380058169.6, dated Mar. 3, 2017 (2 pages).

(56) References Cited

OTHER PUBLICATIONS

Notification of Reasons for Refusal in Japanese Patent Application No. 2015-533222, dated May 30, 2017, with English translation (7 pages).

* cited by examiner

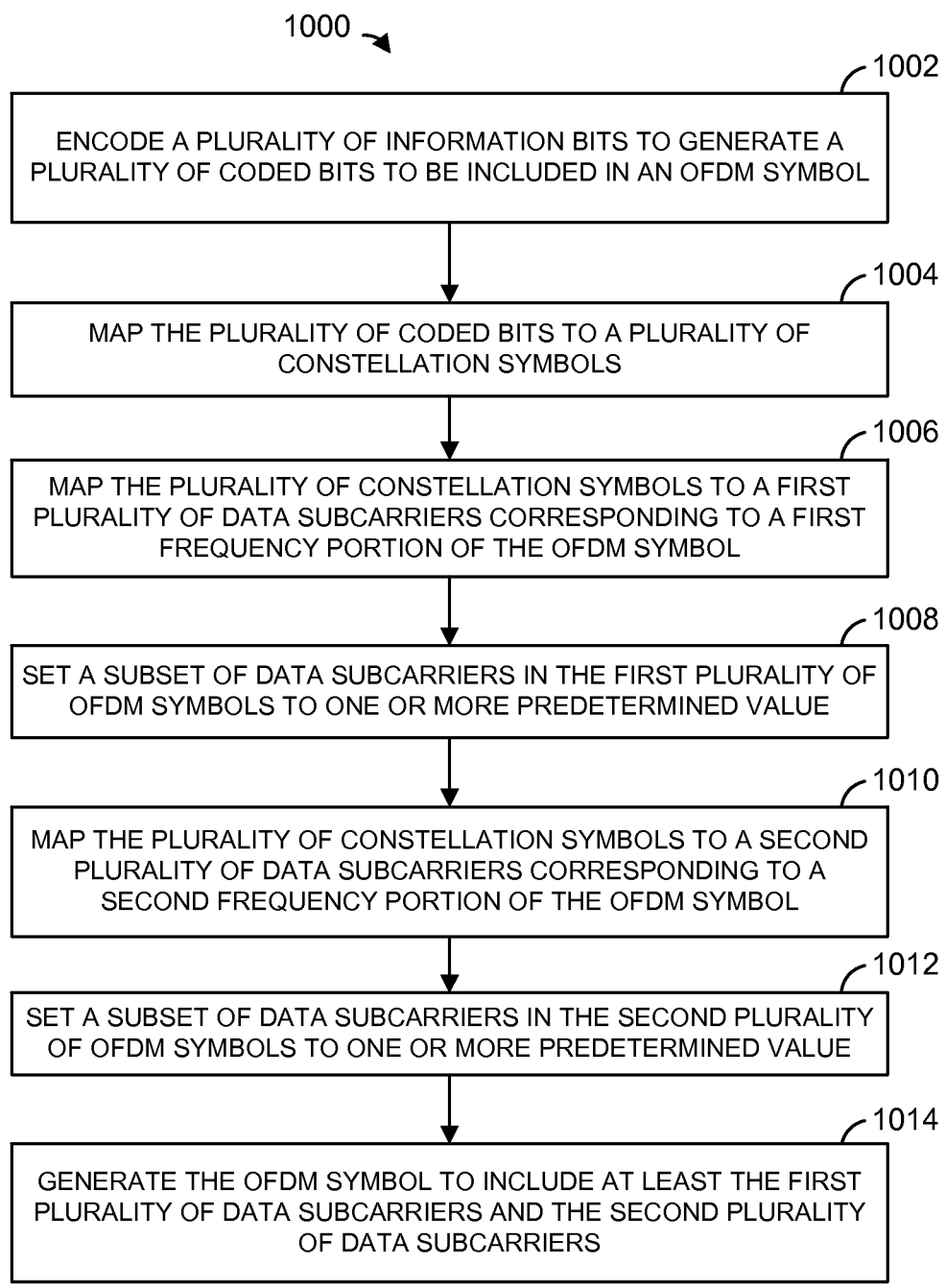

ORTHOGONAL FREQUENCY DIVISION MULTIPLEXING (OFDM) SYMBOL FORMATS FOR A WIRELESS LOCAL AREA NETWORK (WLAN)

CROSS-REFERENCES TO RELATED APPLICATIONS

The present application is a continuation of U.S. patent application Ser. No. 14/033,120 (now U.S. Pat. No. 9,001, 908), entitled "Orthogonal Frequency Division Multiplexing (OFDM) Symbol Formats for a Wireless Local Area Network (WLAN)," filed on Sep. 20, 2013, which is claims the benefit of U.S. Provisional Application No. 61/703,593, entitled "VHTSIGB Modulation," filed on Sep. 20, 2012, and is also a continuation-in-part of U.S. patent application Ser. No. 13/174,186, entitled "Modulation of Signal Field in a WLAN Frame Header," filed on Jun. 30, 2011, which claims the benefit of U.S. Provisional Application No. 61/360,828, entitled "VHTSIGB Modulation," filed on Jul. 1, 2010. The entire disclosures of all of the applications referenced above are hereby incorporated by reference herein.

FIELD OF THE DISCLOSURE

The present disclosure relates generally to communication networks and, more particularly, to communicating device capabilities between devices in a wireless network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

According to a first embodiment, a method of generating an orthogonal frequency division multiplexing (OFDM) symbol of a data unit to be transmitted via a communication channel includes encoding a plurality of information bits to generate a plurality of coded bits to be included in the OFDM symbol, wherein the plurality of information bits corresponds to a first bandwidth, and wherein the OFDM symbol includes a number of data tones corresponding to a second bandwidth, the second bandwidth larger than the first bandwidth. The method also includes mapping the plurality of coded bits to a plurality constellation symbols and mapping the plurality of constellation symbols to a first plurality of data subcarriers corresponding to a first portion of the OFDM symbol. The method further includes setting a subset of data subcarriers in the first plurality of data subcarriers to one or more predetermined values. The method further still includes mapping the plurality of constellation symbols to a second plurality of data subcarriers corresponding to a second portion of the OFDM symbol, and setting a subset of data subcarriers in the second plurality of data subcarriers to one or more predetermined values. The method additionally includes generating the OFDM symbol to include at least the first plurality of data subcarriers and the second plurality of data subcarriers.

In another embodiment, an apparatus comprises a network interface configured to encode a plurality of information bits to generate a plurality of coded bits to be included in an OFDM symbol, wherein the plurality of information bits corresponds to a first bandwidth, and wherein the OFDM symbol includes a number of data tones corresponding to a second bandwidth, the second bandwidth larger than the first bandwidth. The network interface is also configured to map the plurality of coded bits to a plurality constellation symbols, and map the plurality of constellation symbols to a first plurality of data subcarriers corresponding to a first portion of the OFDM symbol. The network interface is also configured to set a subset of data subcarriers in the first plurality of data subcarriers to one or more predetermined values. The network interface is further still configured to map the plurality of constellation symbols to a second plurality of data subcarriers corresponding to a second portion of the OFDM symbol, and set a subset of data subcarriers in the second plurality of data subcarriers to one or more predetermined values. The network interface is additionally configured to generate the OFDM symbol to include at least the data subcarriers corresponding to the first potion and the data subcarriers corresponding to the second portion.

BRIEF DESCRIPTION OF THE DRAWINGS

FIG. 11 is a flow diagram of an example method for generating an OFDM symbol, according to an embodiment.

DETAILED DESCRIPTION

Figure 1:
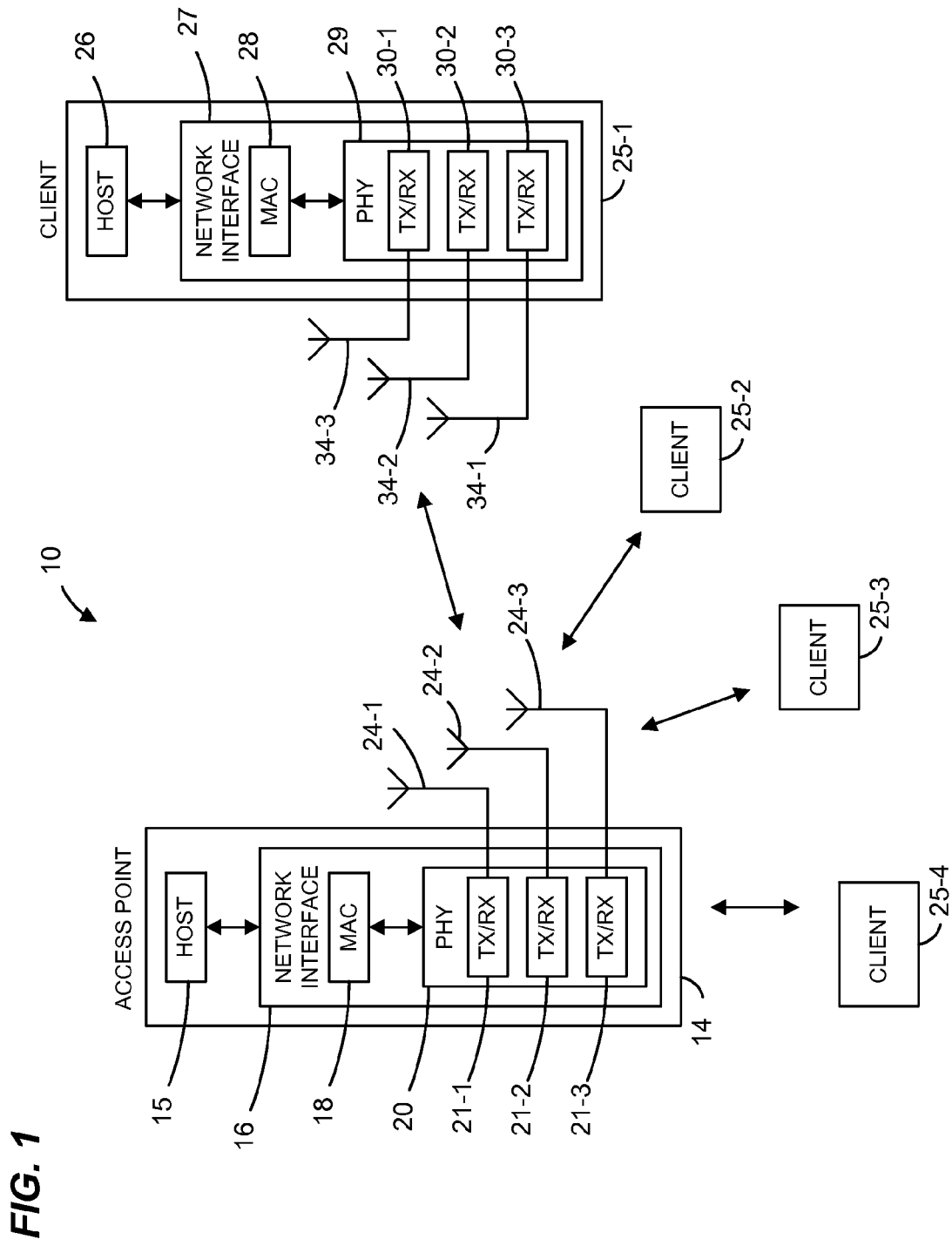
FIG. 1 is a block diagram of an example embodiment of a wireless local area network (WLAN) that utilizes various signal field modulation and mapping techniques described herein.

In embodiments described below, a wireless network device such as an access point (AP) of a wireless local area network (WLAN) transmits data streams to one or more client stations. In an embodiment, the AP is configured to operate with client stations according to a first communication protocol (e.g., the IEEE 802.11ac Standard). Additionally, a different client station in the vicinity of the AP is configured to operate according to a second communication protocol (e.g., the IEEE 802.11n Standard, the IEEE 802.11a Standard, the IEEE 802.11g Standard, etc.), in an embodiment. The first communication protocol and the second communication protocol define operation in a frequency ranges above 1 GHz, and are generally used for applications requiring relatively short range wireless communication with relatively low data rates. The first communication protocol is referred to herein as a very high throughput (VHT) protocol, and the second communication protocol is referred to herein as a legacy protocol. In some embodiments, the AP is additionally or alternatively configured to operate with client stations according to a third communication protocol. The third communication protocol defines operation in a sub 1 GHz frequency ranges and is typically used for applications requiring relatively long range wireless communication with relatively low data rates. The first communication protocol and the second communication protocol are collectively referred to herein as "short range" communication protocols, and the third communication protocol is referred herein as a "long range" communication protocol.

In an embodiment, each one of communication protocols (e.g., short range protocols, long range protocols) defines multiple transmission channel bandwidths. In some embodiments, a data unit transmitted or received by the AP includes a preamble comprising a legacy portion corresponding to a bandwidth defined in a legacy protocol (e.g., 20 MHz bandwidth defined in the 802.11a protocol) and a VHT portion corresponding to the same or a different channel bandwidth defined in the VHT protocol (e.g., 80 MHz bandwidth defined in the VHT protocol). According to an embodiment, the preamble of a data unit includes a plurality of signal fields that carry information required at the receiver to properly identify and decode the data unit. In some embodiments, for example, two signal fields are included in the preamble, a first signal field included in a legacy portion of the preamble and modulated in a manner similar to the legacy portion of the data unit, and a second signal field included in a VHT portion of the preamble and modulated in a manner similar to the VHT data portion of the data unit. In one such embodiment, the second signal field is modulated similar to the VHT data portion of the data unit but using a lower coding rate and a smaller constellation size than the VHT data portion. Further, in some embodiments, bit allocation for the second signal field is the same regardless of the specific channel bandwidth that the data unit occupies. For example, in an embodiment, bit allocation is specified for the smallest possible bandwidth defined by the VHT protocol (e.g., 20 MHz bandwidth, 40 MHz, etc.) and bit insertion and/or duplication is utilized to transmit the second signal field in a higher VHT bandwidth. Further, in an embodiment, a VHT data portion of a data unit includes multiple spatial data streams directed to a single user (SU) or multiple users (MU), while the second signal field is limited to a single data stream. In these embodiments, the single stream of the second signal field is mapped in some manner to the multiple space streams and/or multiple users corresponding to the data portion of the data unit.

FIG. 1 is a block diagram of an example embodiment of a wireless local area network (WLAN) 10 that utilizes various signal field modulation and mapping techniques described herein. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., the IEEE 802.11ac Standard, now in the process of being standardized). The first communication protocol is also referred to herein as a very high throughput (VHT) protocol. In another embodiment, the MAC processing unit 18 and the PHY processing unit 20 are also configured to operate according to at least a second communication protocol (e.g., the IEEE 802.11n Standard, the IEEE 802.11a Standard, etc.). In yet another embodiment, the MAC processing unit 18 and the PHY processing unit 20 are additionally or alternatively configured to operate according to a long range communication protocol (e.g., the IEEE 802.11ah Standard, the IEEE 802.11af Standard, etc.).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or all of the client stations 25-2, 25-3 and 25-4, have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol, according to an embodiment.

In various embodiments, the PHY processing unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol, according to an embodiment.

Figure 2:
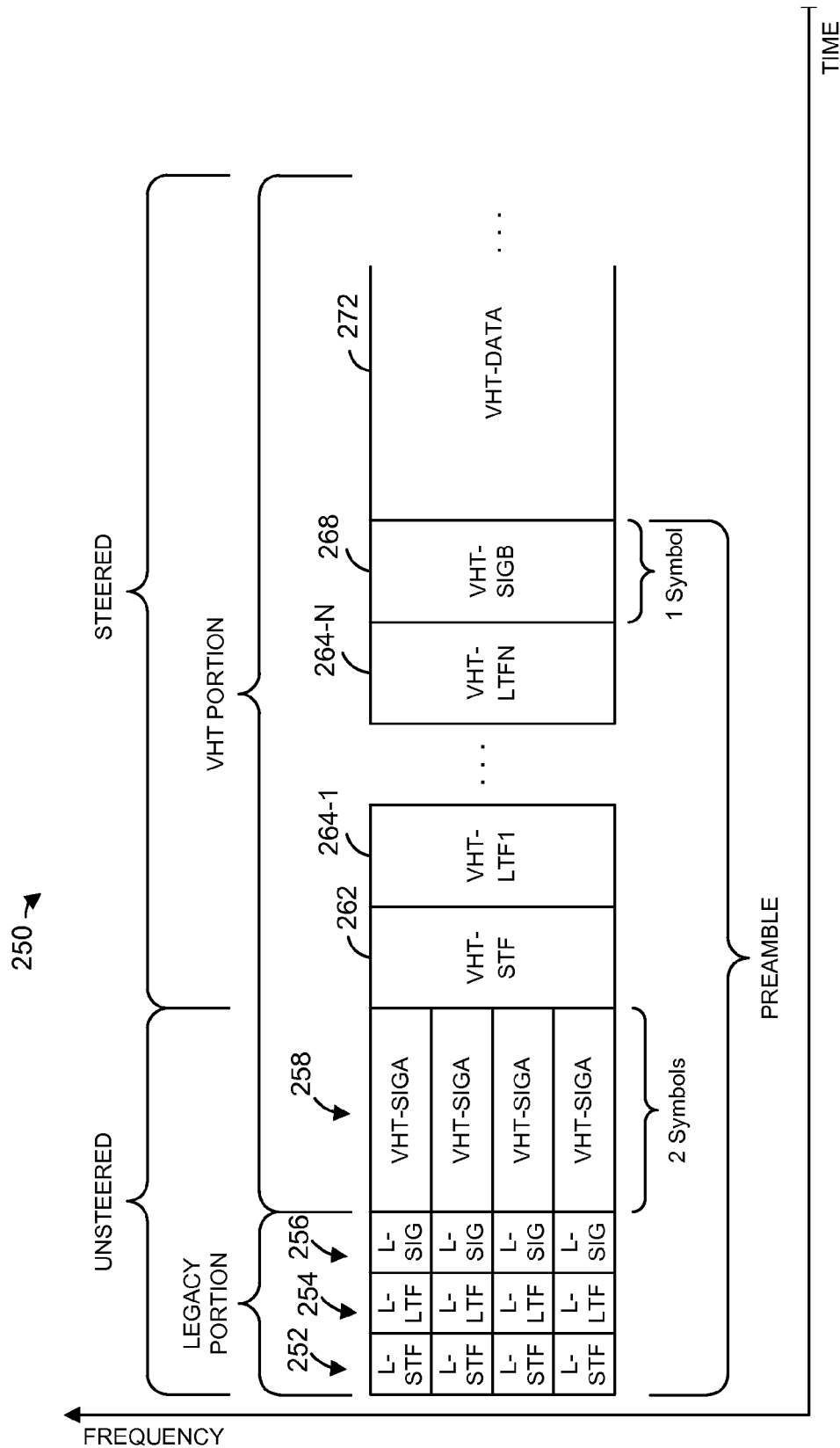
FIG. 2 is a diagram of an example data unit format, according to an embodiment.

FIG. 2 is a diagram of a data unit 250 that the AP 14 is configured to transmit to the client station 25-1, according to an embodiment. In an embodiment, the client station 25-1 is also configured to transmit the data unit 250 to the AP 14. The data unit 250 conforms to the VHT protocol and occupies an 80 MHz band. In other embodiments, data units similar to the data unit 250 occupy different bandwidths such as 20 MHz, 40 MHz, 120 MHz, 160 MHz, or any suitable bandwidth. Additionally, the band need not be contiguous in frequency, but may include two or more smaller bands separated in frequency. For example, according to an embodiment, the data unit 250 occupies a 160 MHz band composed of two non-contiguous 80 MHz bands separated in frequency by some suitable minimum bandwidth, in some scenarios such as when conditions and devices support a 160 MHz channel. The data unit 250 includes a preamble having four legacy short training fields (L-STFs) 252, four legacy long training fields (L-LTFs) 254, four legacy signal fields (L-SIGs) 256, four first very high throughput signal fields (VHT-SIGAs) 258 a very high throughput short training field (VHT-STF) 262, N very high throughput long training fields (VHT-LTFs) 264, where N is an integer, and a second very high throughput signal field (VHT-SIGB) 268. The data unit 250 also includes a data portion 272. The L-STFs 252, the L-LTFs 254, and the L-SIGs 256 form a legacy portion. The VHT-STF 262, the VHT-SIGAs 258, the VHT-LTFs 264, the VHT-SIGB 268, and the data portion 266 form a very high throughput (VHT) portion.

In the embodiment of FIG. 2, each of the L-STFs 252, each of the L-LTFs 254, each of the L-SIGs 256, and each of the VHT-SIGAs 258, occupy a 20 MHz band. In the present disclosure, several example data units, including the data unit 250, having an 80 MHz contiguous bandwidth are described for the purposes of illustrating embodiments of frame formats, but these frame format embodiments and other embodiments are applicable to other suitable bandwidths (including noncontiguous bandwidths). For instance, although the preamble of FIG. 2 includes four of each of the L-STFs 252, the L-LTFs 254, the L-SIGs 256, and the VHT-SIGAs 258, in other embodiments in which the orthogonal frequency division multiplex (OFDM) data unit occupies a cumulative bandwidth other than 80 MHz, such as 20 MHz, 40 MHz, 120 MHz, 160 MHz, etc., a different suitable number of the L-STFs 252, the L-LTFs 254, the L-SIGs 256, and the VHT-SIGAs 258 is utilized accordingly (e.g., one of each of the L-STFs 252, the L-LTFs 254, the L-SIGs 256, and the VHT-SIGAs 258, for an OFDM data unit occupying 20 MHz, two of each of the fields for a 40 MHz bandwidth OFDM data unit, six of each of the fields for a 120 MHz bandwidth OFDM data unit, and eight of each of the fields for a 160 MHz bandwidth OFDM data unit). Also in a 160 MHz bandwidth OFDM data unit, for example, the band is not contiguous in frequency, in some embodiments and situations. Thus, for example, the L-STFs 252, the L-LTFs 254, the L-SIGs 256, and the VHT-SIGAs 258 occupy two or more bands that are separated from each other in frequency, and adjacent bands are separated in frequency by at least one MHz, at least five MHz, at least 10 MHz, at least 20 MHz, for example, in some embodiments. In the embodiment of FIG. 2, each of the VHT-STF 262, the VHT-LTFs 264, the VHT-SIGB 268, and the data portion 266 occupy an 80 MHz band. If the data unit conforming to the first communication protocol is an OFDM data unit that occupies a cumulative bandwidth such as 20 MHz, 40 MHz, 120 MHz, or 160 MHz OFDM, the VHT-STF, VHT-LTFs, VHT-SIGB and VHT data portion occupy the corresponding whole bandwidth of the data unit, according to an embodiment.

Further, according to the embodiment of FIG. 2 in which the device generating the data unit 250 includes multiple antennas and is capable of transmit beamforming or beamsteering, the VHT-SIGA 258 is included within an unsteered (or "omnidirectional" or "pseudo-omnidirectional"; the terms "unsteered" and "omnidirectional" as used herein are intended to also encompass the term "pseudo-omnidirectional") portion of the data unit 250 and contains PHY information that is common to each of the client stations 25 in FIG. 1. On the other hand, the VHT-SIGB 268 is contained in a "steered" portion. In an embodiment in which the data unit 250 is a multi-user transmission (e.g., the data unit 250 includes independent data streams for corresponding different receive devices), the steered portion includes different data for different clients 25 that are simultaneously transmitted, via the antennas 24 in FIG. 1, over different spatial channels to carry different (or "user-specific") content to each of the client stations 25. Accordingly, in these embodiments the VHT-SIGAs 258 carry information common to all users, while the VHT-SIGB 268 includes user-specific information. On the other hand, in an embodiment in which the data unit 250 is a single-user transmission, the steered portion includes data for a particular client 25 that are transmitted and beamsteered, via the antennas 24, to the client station 25.

According to an embodiment, each the VHT-SIGAs 258 comprises two OFDM symbols that are modulated in a manner similar to the legacy L-SIG fields 256. On the other hand, the VHT-SIGB field 268 comprises a single OFDM symbol that is modulated in a manner similar to the VHT data portion 272, according to some embodiments and/or scenarios described below.

Figure 3:
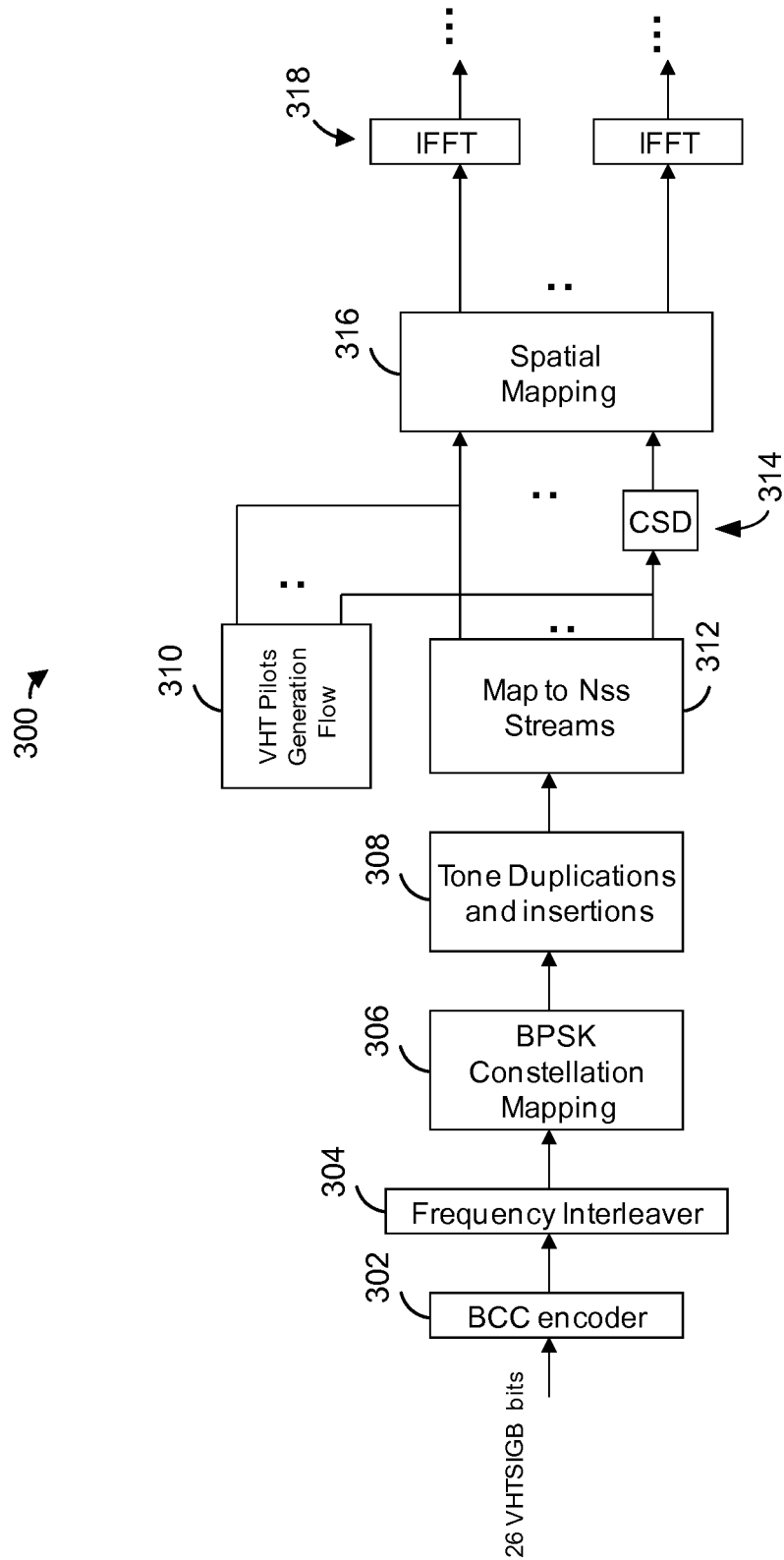
FIG. 3 is a block diagram of an example PHY processing unit, according to an embodiment.

FIG. 3 is a block diagram of an example PHY processing unit 300 configured to generate an OFDM symbol, according to an embodiment. For example, in an embodiment and/or scenario, the PHY processing unit 300 generates an OFDM symbol corresponding to the VHT-SIGB 268 of the data unit 250 (FIG. 2). In another embodiment and/or scenario, the PHY processing unit 300 generates an OFDM symbol corresponding to the data portion 272 of the data unit 250. In other embodiments and/or scenarios, the PHY processing unit 300 generates an OFDM symbol corresponding to another portion of the data unit 250, or an OFDM symbol to be included in another suitable data unit, in other embodiments and/or scenarios. Referring to FIG. 1, the AP 14 and the client station 25-1, in one embodiment, each include a PHY processing unit such as the PHY processing unit 300.

According to an embodiment, the PHY unit 300 includes a forward error correction (FEC) encoder 302 that generally encodes an input data stream to generate a corresponding encoded stream. In embodiment, the FEC encoder utilizes binary convolutional coding (BCC) with the coding rate of 1/2. In other embodiments, the FEC encoder utilizes other suitable coding types and/or other suitable coding rates. The FEC encoder 302 is coupled to a frequency interleaver 304 that interleaves bits of an encoded stream (i.e., changes the order of the bits) to prevent long sequences of adjacent noisy bits from entering a decoder at the receiver.

A constellation mapper 306 maps an interleaved sequence of bits to constellation points corresponding to different subcarriers of an OFDM symbol. More specifically, the constellation mapper 306 translates every log2(M) into one of M constellation points. In one embodiment, the constellation mapper 306 operates according to a binary phase shift keying (BPSK) modulation scheme. In other embodiments, other suitable modulation schemes are utilized. The constellation mapper 306 is coupled to a tone duplication and insertion unit 308 that implements various duplication and insertion techniques described below in various embodiments and/or scenarios.

The output of the tone duplication and insertion unit 308 is presented to a stream mapper unit 312, according to an embodiment. In an embodiment, the stream mapper 312 spreads the constellation points to a greater number of space-time streams. A pilot generator unit 310 generates pilot tones to be used, for example, for frequency offset estimation at the receiver, and insets the pilot tones into the symbol OFDM tones at the space-time outputs of the stream mapper 312. A plurality of cyclic shift diversity (CSD) units 314 insert cyclic shifts into all but one of the space-time streams to prevent unintentional beamforming.

A spatial mapping unit 316 maps the space-time streams to transmit chains corresponding to one or more available transmit antennas. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

In one embodiment, the spatial mapping unit 316 applies a steering matrix Q (e.g., multiplies an NSTS×1 signal vector s by Q, i.e., Qs), where Q has a size of (NTX×NSTS), where NTX is the number of transmit chains and NSTS is the number of space-time streams. When beamforming is utilized, the matrix Q is generated based on the multiple input multiple output (MIMO) channel between the transmitter and the receiver. In one embodiment, NTX has a maximum value of 8. In another embodiment, NTX has a maximum value of 16. In other embodiments, NTX has a different maximum value such as 4, 32, 64, etc.

Each output of the spatial mapping unit 316 corresponds to a transmit chain, and each output of the spatial mapping unit 316 is operated on by an inverse discrete Fourier transform (IDFT) unit 318 that converts a block of constellation points to a time-domain signal. In an embodiment, the IDFT unit 318 is configured to implement an inverse fast Fourier transform (IFFT) algorithm. Each time-domain signal is provided to a transmit antenna for transmission.

The number of sub-carriers (or tones) in an OFDM symbol generally depends on the bandwidth (BW) of the channel being utilized, according to an embodiment. For example, an OFDM symbol for a 20 MHz channel corresponds to a size 64 IDFT and includes 64 tones, whereas an OFDM symbol for a 40 MHz channel corresponds to a size 128 IDFT and includes 128 tones, according to an embodiment. In an embodiment, the tones in an OFDM symbol include guard tones for filter ramp up and ramp down, DC tones for mitigating radio frequency interference, and pilot tones for frequency offset estimation. The remaining tones can be used to transmit data or information bits ("data tones"), according to an embodiment. General transmitter flow of an example PHY processing unit configured to generate data units conforming to the first communication protocol as well as various example transmission channels and tone mappings that are utilized in the data units corresponding to some embodiments of the present disclosure are described in U.S. patent application Ser. No. 12/846,681, entitled "Methods and Apparatus for WLAN Transmission", filed on Jul. 29, 2010, which is hereby incorporated by reference herein in its entirety.

In an embodiment, tone and/or bit allocation for an OFDM symbol in a data unit is the same regardless of the channel bandwidth occupied by the data unit. For example, OFDM symbols are generated according to a format defined for a "base" bandwidth, such as the smallest channel bandwidth defined by the communication protocol, and tone duplications and insertion techniques described herein are used to generate OFDM symbols corresponding to wider channel bandwidths. For example, a 20 MHz channel bandwidth is used as the base bandwidth, in an embodiment. In this embodiment, OFDM symbols are generated according to tone and/or bit allocation defined for a 20 MHz channel bandwidth, and tone duplication and insertions techniques described herein are utilized to generate OFDM symbols corresponding to higher bandwidth channels, such as a 40 MHz channel, an 80 MHz channel, etc. In another embodiments, a 40 MHZ bandwidth is used as the base bandwidth, and higher bandwidth OFDM symbols are generated using tone duplication and insertion techniques described herein. In other embodiments, other suitable base bandwidths are utilized.

Generally speaking, any suitable bandwidth corresponding to an IDFT of size N can be utilized as a base bandwidth, and tone duplication and insertion techniques described herein can be used to generate an OFDM symbol corresponding to an IDFT of larger size, such as a kN-point IDFT, based on tone and/or bit allocation defined for the N-point IDFT, where N and k are integers, in various embodiments and/or scenarios. It should be noted that while tone duplication and insertion techniques are described below as generally performed to generate a wider bandwidth signal field based on tone and/or bit allocation defined for a lower bandwidth signal field, such techniques are not limited to OFDM symbols corresponding to signal fields and are applied to OFDM symbols corresponding to other field (e.g., training fields, data field) of an OFDM data unit, in other embodiments.

As an example, referring again to FIG. 2, the bit allocation for the VHT-SIGB field 268 of the data unit 250 is the same regardless of the channel bandwidth occupied by the particular data unit being generated, according to an embodiment. Also, in some embodiments, the same number of guard tones, DC tones, and pilot tones are used in an OFDM symbol generated for the VHT-SIGB 268 as in a symbol generated for the data portion of the data unit 250. In one such embodiment, the guard tones, the DC tones, and the pilot tones are the same frequency tones within an OFDM symbol generated for the VHT-SIGB field 268 as in an OFDM symbol generated for the data portion 272.

In an embodiment, VHT-SIGB field 268 bit allocation corresponds to a 20 MHz OFDM symbol with the corresponding number of data tones, and the same bit allocation is utilized for data units corresponding to larger bandwidths (e.g., 40 MHz, 80 MHz, etc.). In one such embodiment, 26 bits are allocated for the VHT-SIGB field, with 20 bits allocated for information bits and 6 bits allocated for tail bits, for example. In an embodiment in which VHT-SIGB field 268 is encoded with a BCC encoder at 1/2 coding rate, the 26 bits are encoded into 52 data bits corresponding to the 52 data tones available for a 20 MHz channel. In other embodiments, other suitable bit allocations and other suitable coding and modulation schemes are used for the VHT-SIGB field 268. In various embodiments and/or scenarios in which the same number of bits is allocated for larger bandwidth channels with a corresponding larger number of data tones, tone duplication and insertion techniques described herein are utilized to fill the remaining available data tones.

Figure 4:
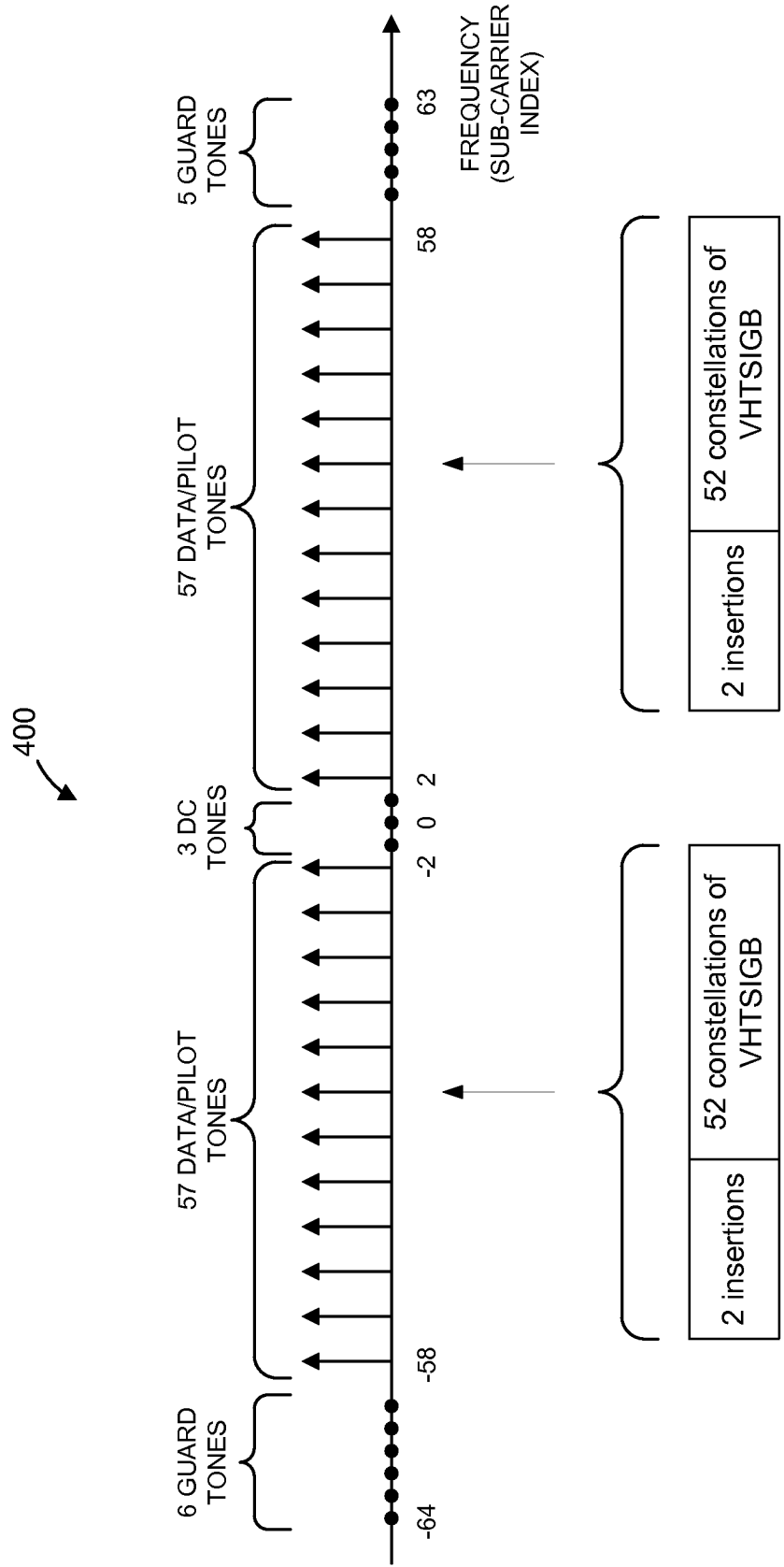
FIG. 4 is a diagram of an example OFDM symbol for 40 MHz communication channel that the PHY processing unit of FIG. 3 is configured to generate, according to an embodiment.

FIG. 4 is a diagram of an OFDM symbol 400 generated for a VHT-SIGB field (such as VHT-SIGB field 268 of FIG. 2) of a data unit for a 40 MHz channel, according to an embodiment. The OFDM symbol 400 corresponds to a size 128 IDFT and includes 128 tones. The 128 tone slots are indexed from −64 to +63, in an embodiment. The 128 tones include guard tones, a direct current (DC) tones, data tones, and pilot tones. The six lowest frequency tones and the five highest frequency tones are guard tones. The three tones indexed from −1 to +1 are DC tones. The OFDM symbol 400 also includes 6 pilot tones and 108 data tones, according to an embodiment. As illustrated in FIG. 4, the 108 data tones include 52 tones corresponding to the VHT-SIGB bits with 2 inserted tones, and the resulting 54 tones are duplicated once in order to fill the remaining tones of the OFDM symbol. In the OFDM symbol 400, the two inserted tones occupy the lowest data/pilot frequency tone slots in the lower channel sideband and the two lowest data/pilot frequency tone slots in the upper channel sideband.

Figure 5:
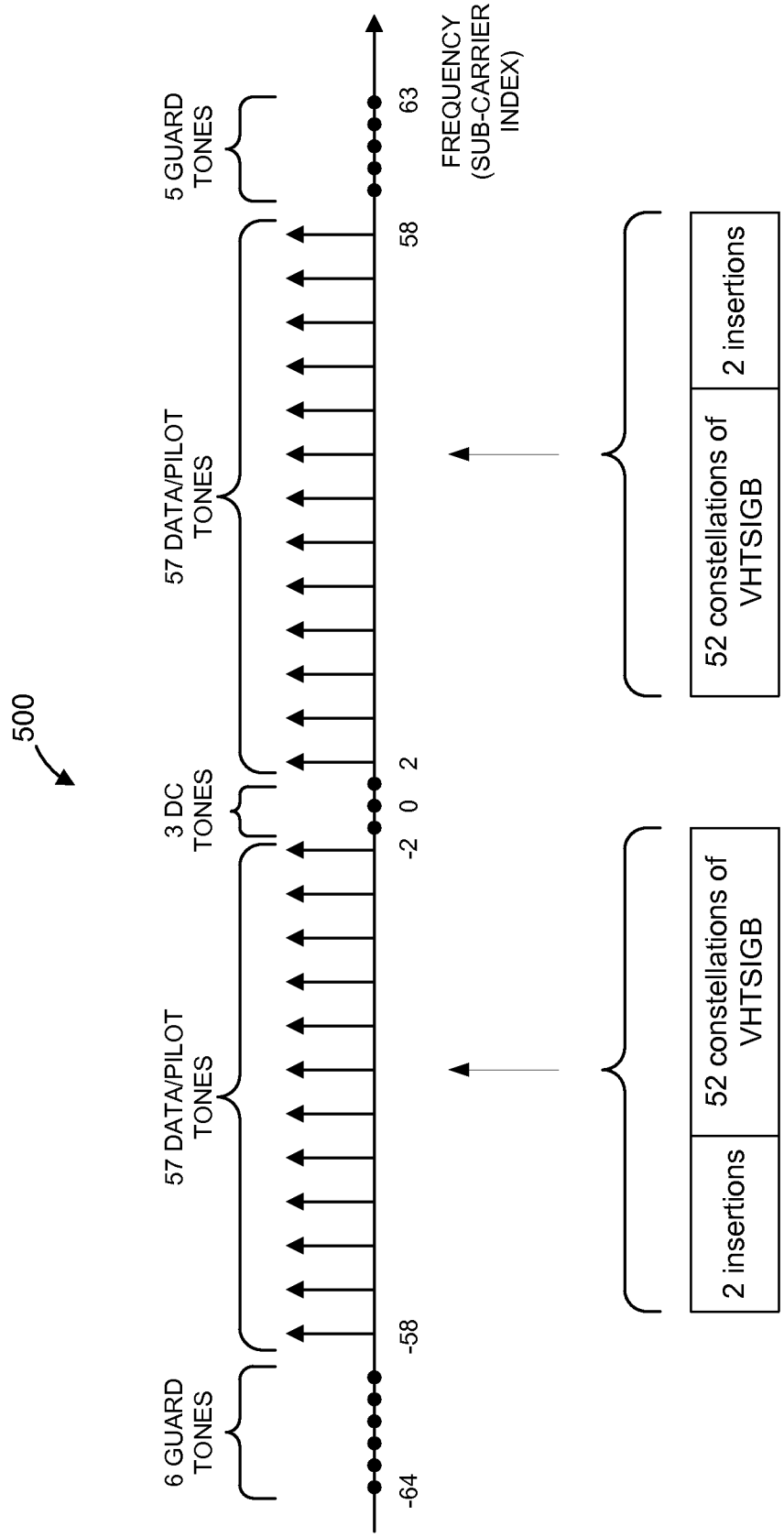
FIG. 5 is a diagram of another example OFDM symbol for 40 MHz communication channel that the PHY processing unit of FIG. 3 is configured to generate, according to another embodiment.

FIG. 5 is a diagram of another example OFDM symbol 500 generated for a VHT-SIGB field (such as VHT-SIGB field 268 of FIG. 2) of a data unit for a 40 MHz channel, according to another embodiment. The OFDM symbol 500 is similar to the OFDM symbol 400 except that the insertion tones in the OFDM symbol 500 occupy the two lowest data/pilot frequency tone slots in the lower channel sideband and the two highest data/pilot frequency tone slots in the upper channel sideband.

In other embodiments, the two insertion tones occupy any other suitable data/pilot frequency tone slots in the OFDM symbol 400 or the OFDM symbol 500.

Figure 6:
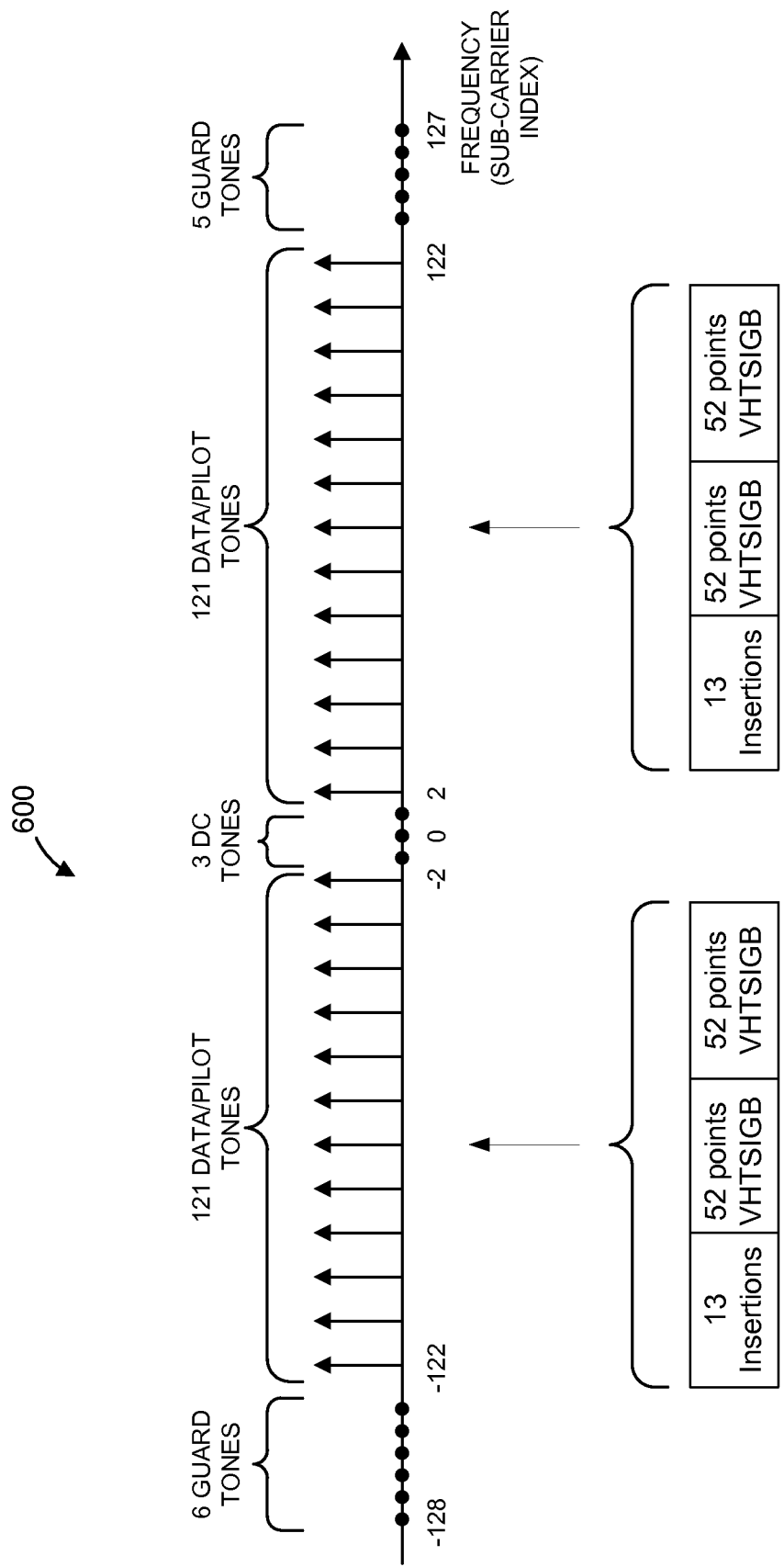
FIG. 6 is a diagram of an example OFDM symbol for 80 MHz communication channel that the PHY processing unit of FIG. 3 is configured to generate, according to an embodiment.

FIG. 6 is a diagram of an OFDM symbol 600 generated for a VHT-SIGB field (such as VHT-SIGB field 268 of FIG. 2) of a data unit for an 80 MHz channel, according to an embodiment. The OFDM symbol 600 corresponds to a size 256 IDFT and includes 256 tones. The 256 tone slots are indexed from −128 to +127, in an embodiment. The 256 tones include guard tones, DC tones, data tones, and pilot tones. The six lowest frequency tones and the five highest frequency tones are guard tones. The three tones indexed from −1 to +1 are DC tones. The OFDM symbol 350 also includes 8 pilot tones and 234 data tones. The 234 data tones include 52 tones corresponding to the VHT-SIGB information bits, 52 tones that are duplicates of the VHT-SIGB information bits and 13 inserted tones, and the resulting 117 tones duplicated once. In the OFDM symbol 600, the thirteen inserted tones occupy the lowest frequency pilot/data tone slots in the lower channel sideband and the lowest frequency pilot/data tone slots in the upper channel sideband.

Figure 7:
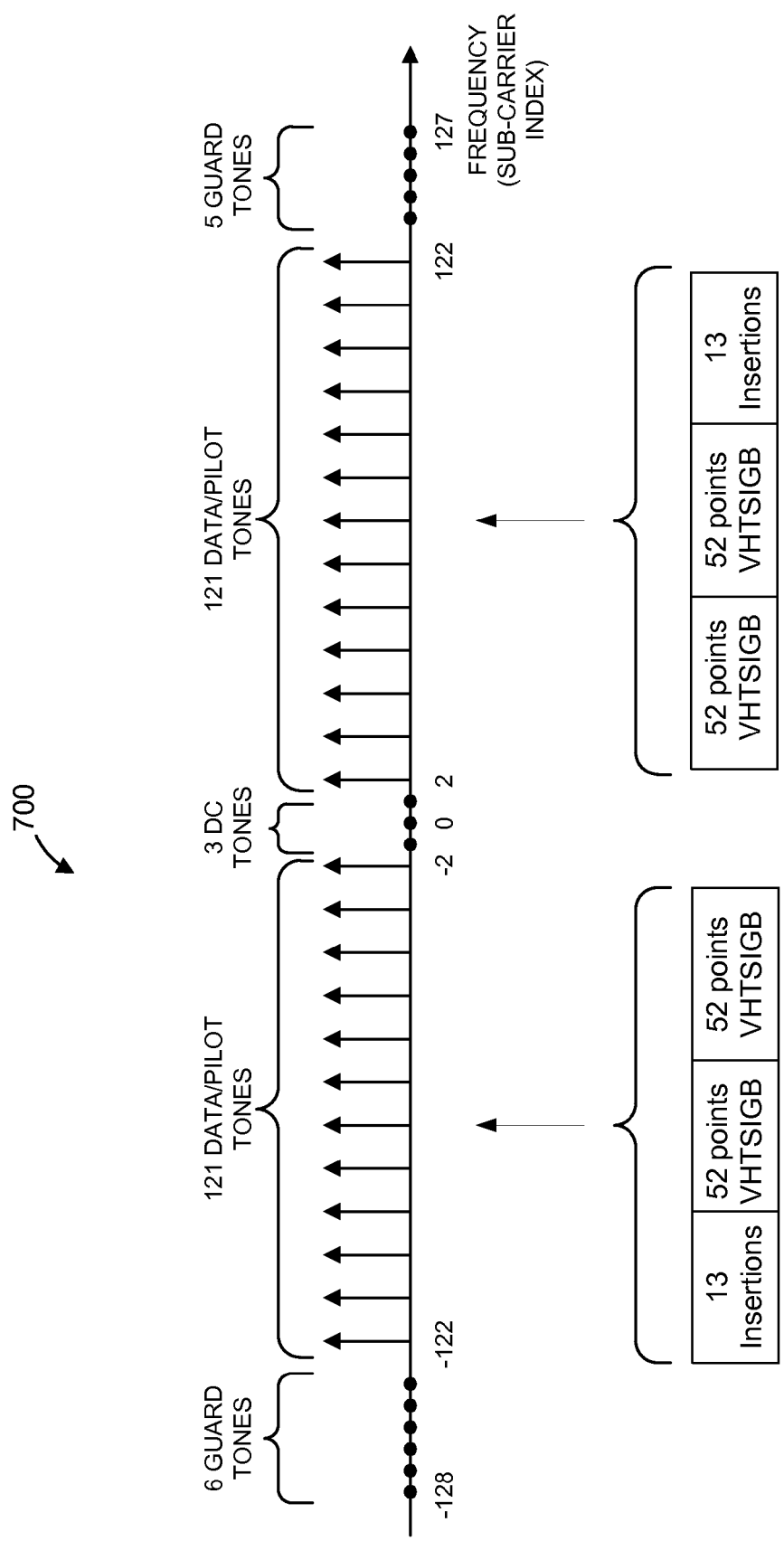
FIG. 7 is a diagram of another example OFDM symbol for 80 MHz communication channel that the PHY processing unit of FIG. 3 is configured to generate, according to another embodiment.

FIG. 7 is a diagram of another OFDM symbol 700 (such as VHT-SIGB field 268 of FIG. 2) generated for a VHT-SIGB field of a data unit for an 80 MHz channel, according to another embodiment. The OFDM symbol 700 is similar to the OFDM symbol 600 except that the insertion tones in the OFDM symbol 700 occupy the thirteen lowest frequency data/pilot tone slots in the lower channel sideband and the highest frequency data/pilot tone slots in the upper channel sideband.

In other embodiments, the thirteen insertion tones occupy other suitable data/pilot tone slots in the OFDM symbol 600 or the OFDM symbol 700.

According to an embodiment or a situation, the insertion tones in symbol 400, the insertion tones in the symbol 500, the insertion tones in the symbol 600, and/or the insertion tones in the symbol 700 carry values of some of the VHT-SIGB information bits and/or VHT-SIGA information bits. Similarly, in some other embodiments and/or situations, the insertion tones in symbol 400, the insertion tones in the symbol 500, the insertion tones in the symbol 600, and/or the insertion tones in the symbol 700 carry values of some of the LSIG information bits. Alternatively, in other embodiments and/or situations, the insertion tones in symbol 400, the insertion tones in the symbol 500, the insertion tones in the symbol 600, and/or the insertion tones in the symbol 700 are null (0) tones. These embodiments have an advantage of using no extra transmit power for transmitting the insertion tones (i.e., all of the transmit power is used for the VHT-SIGB information and tail bits). In other embodiment and/or scenarios, the insertion tones in symbol 400, the insertion tones in the symbol 500, the insertion tones in the symbol 600, the insertion tones in the symbol 700 tones are modulated with any other suitable values.

In other embodiments and/or scenarios, the insertion tones in symbol 400, the insertion tones in the symbol 500, the insertion tones in the symbol 600, and/or the insertion tones in the symbol 700 are modulated with any other suitable values.

In an embodiment, the client station 25-1 in FIG. 1 discards the inserted tones in a VHT-SIGB field of a received data unit during the decoding and demodulation process. Alternatively, if the inserted tones are of values corresponding to some information bits of a signal field (e.g., VHT-SIGA, VHT-SIGB, L-SIG), the receiver utilizes the extra diversity provided thereby during the decoding and demodulating process rather than simply discarding the inserted tones, according to an embodiment.

In some embodiments, an 80 MHz signal field is generated using tone and/or bit allocation for a 40 MHz bandwidth as the base bandwidth. For example, an 80 MHz VHT-SIGB field is generated using tone and/or bit allocation defined for a 40 MHz VHT-SIGB field, using tone duplication and insertion techniques described herein to fill the remaining data tones in the 80 MHz VHT-SIGB field, in an embodiment. Similarly, a 160 MHZ signal field is generated using tone and/or bit allocation for an 80 MHz signal field, using tone duplication and insertion techniques described herein to fill the remaining data tones of the 160 MHz field, in an embodiment. In another embodiment, a 160 MHz MHz field is generated using tone and/or bit allocation for a 40 MHz bandwidth signal field, using tone insertion and duplication techniques described herein. Generally speaking, a base bandwidths B is utilized to generate an OFDM symbol for a mB bandwidth communication channel, where m is an integer, in various embodiments and/or scenarios.

In an embodiment, a field corresponding to a 20 MHz or another suitable bandwidth is utilized to generate a larger base bandwidth, such as a 40 MHz base bandwidth. For example, one or more uncoded bits are inserted into a bit stream corresponding to a 20 MHz bandwidth channel or another suitable bandwidth channel such that, after encoding, the encoded bit stream corresponds to a larger bandwidth, such as a 40 MHz bandwidth. Then, tone duplication and insertion techniques are applied to the base bandwidth to generate OFDM symbols for higher bandwidth channels. For example, referring to FIG. 3, duplication of uncoded information bits is utilized and, if needed, one or more additional bits are added to the uncoded information bit stream (e.g., before duplication of the bits or after duplication of the bits occurs) prior to providing the bit stream to the encoder 302, such that, after being encoded by the encoder 302, the resulting bit stream (coded bits) corresponds to a wider base bandwidth, such as a 40 MHz base bandwidth. In this embodiment, the coded bits are then provided to the constellation mapping unit 306, which maps the coded bits to constellation points corresponding to OFDM tones of the base bandwidth, such as a 40 MHz bandwidth. Then, tone duplication and insertion unit 308 duplicates the resulting OFDM tones and/or inserts additional OFDM tones to generate a wider bandwidth OFDM symbol, such as an 80 MHz OFDM symbol or a 160 MHz OFDM symbol, for example, in an embodiment.

As discussed above, in some embodiments, the AP14 is configured to communicate with one or more client stations according to a long range communication protocol which generally defines operation in sub 1 GHz frequency ranges. In some such embodiments, the long range communication protocol defines one or more physical layer data unit formats the same as or similar to physical layer data unit format defined by one or more of the short range communication protocols. In one embodiment, to support communication over a longer range, and also to accommodate typically smaller bandwidth channels available at lower (sub 1-GHz) frequencies, the long range communication protocol defines data units having a format that is substantially the same as a physical layer data unit format defined by a long range communication protocol, but generated using a lower clock rate. In an embodiment, the AP operates at a clock rate suitable for short range (and high throughput) operation, and down-clocking is used to generate a new clock signal to be used for the sub 1 GHz operation. As a result, in this embodiment, a data unit that conforms to the long rage communication protocol ("long range data unit") maintains a physical layer format of a data unit that generally conforms to a short range communication protocol ("short range data unit"), but is transmitted over a longer period of time. As an example, data units that conform to the IEEE 802.11ah Standard are generated according to a format defined in the IEEE 802.11n Standard or IEEE 802.11ac Standard, but generated using a clock signal down-clocked by a ratio of ten. In this embodiment, short range data units generally correspond to channel bandwidths described above (e.g., 20 MHz, 40 MHz, 80 MHz, 160 MHz), and long range data units have corresponding bandwidths down-clocked with the down-clocking ratio of 10 (e.g., 2 MHz, 4 MHz, 8 MHz, 16 MHz).

In other embodiments, other suitable down-clocking ratios are utilized. For example, data units according to the IEEE 802.11 af are down-clocked versions of the IEEE 802.11n or IEEE 802.11ac data units with the down-clocking ration of 7.5, in an embodiment. Additionally, in some embodiments, the long range communication protocol defines one or more additional bandwidth channels, such as a 1 MHz bandwidth channel, intended for operations requiring higher signal to noise ration performance, such as extended range or control mode operations, for example. Various examples of long range data units generated by down-clocking as well as example PHY formats of long range data units utilized in some embodiments are described in U.S. patent application Ser. No. 13/359,336, filed Jan. 26, 2012, which is hereby incorporated by reference herein in its entirety.

In some such embodiments, a lowest down-clocked channel bandwidth is utilized as the base bandwidth, and tone duplication and insertion techniques described herein are used to generate OFDM symbols corresponding to higher channel bandwidths. For example, tone and/or bit allocation defined for OFDM symbols corresponding to a 1 MHz base bandwidth or a 2 MHz base bandwidth is utilized to generate OFDM symbols corresponding to higher bandwidths, and tone duplication and insertion techniques described herein are utilized to generate OFDM symbols for higher bandwidth channels (e.g., 2 MHz, 4 MHz, 8 MHz, 16 MHz). As an example, referring to FIGS. 4 and 5, the depicted OFDM symbols 400 and 500 correspond to a 4 MHz bandwidth of the long range communication protocol generated using tone allocation defined for a 2 MHz bandwidth channel, according to various embodiments. As another example, referring to FIGS. 6 and 7, the depicted OFDM symbols 600 and 700 correspond to an 8 MHz bandwidth of the long range communication protocol generated using tone allocation defined for a 2 MHz bandwidth channel, in various embodiments. In another embodiment, tone and/or bit allocation for another suitable base bandwidth, such as 4 MHz bandwidth, is utilized, and tone duplication and insertion techniques described herein are used to generate OFDM symbols corresponding to a higher bandwidth channel, such as an 8 MHz channel or a 16 MHz channel. Generally speaking, a base bandwidths B is utilized to generate an OFDM symbol for a mB bandwidth communication channel, where m is an integer, in various embodiments and/or scenarios.

Referring again to FIG. 2, in embodiments in which the data portion 272 includes multiple spatial streams, the VHT-SIGB field 268 is mapped to the multiple streams accordingly. In some such embodiments, the VHT-STF fields 264 that contain training sequences corresponding to the multiple spatial streams are mapped to multiple spatial streams via a matrix P. In some embodiments and/or scenarios, the same matrix P is used to map a single data stream in the VHT-SIGB field 268 to multiple data streams corresponding to multiple spatial streams in the VHT-data portion 272. More specifically, in an embodiment, the VHT-LTF training fields 264 are mapped to the corresponding spatial streams according to:

$$VHTLTF^{(k)} = [L_1, L_2, \ldots L_{N_{LTF}}] = Q^{(k)} D^{(k)} [P_{*1}, P_{*2}, \ldots P_{*N_{LTF}}] s^{(k)} \qquad \text{Equation 1}$$

where $Q^{(k)}$ corresponds to spatial mapping of the $k^{th}$ tone of a VHT-LTF training field, $D^{(k)}$ corresponds to a CSD phase shift for the $k^{th}$ tone, $P^*_1$, $P^*_{N_{LTF}}$ are columns of the mapping matrix P, and $S^{(k)}$ is the $k^{th}$ tone of a VHT-LTF training symbol.

Referring still to FIG. 2, according to an embodiment, the VHT-SIGB field 268 is mapped to multiple spatial streams of the data unit 250 using one of the columns P*1, . . . , P*NLTF of Equation 1. For example, in an embodiment, the first column of the P matrix is used to map the VHT-SIGB field 268:

$$VHTSIGB^{(k)} = Q^{(k)} D^{(k)} P_{*1} s_{VHTSIGB}^{(k)} \qquad \text{Equation 2}$$

where $S_{VHTSIGB\_U1}^{(k)}$ is the $k^{th}$ tone of the VHT-SIGB symbol. In other embodiments and/or scenarios, a different column of the P matrix is used to map the VHT-SIGB field 268.

In some embodiments, the data unit 250 is a multiuser (MU) data unit, i.e., the data unit 250 includes user-specific information for more than one user (e.g., more than one of the client stations 25 in FIG. 1). For example, the data unit 250 includes use-specific information for two users (i.e., the data unit 250 is a "two-user" data unit), according to an embodiment. The data unit 250 includes data for different numbers of users (e.g., 3 users, 4 users, 5 users, etc.) in other embodiments and/or scenarios. In some such embodiments, the number of VHT-LTF fields 264 is directly related to the sum of spatial streams for all intended recipients of the data unit (users), and a single "giant" mapping matrix P is used to jointly map the training information tones for all users and all spatial streams. For example, if the data unit 250 is a two-user data unit, the VHT-LTF fields 268 are mapped, in an embodiment, according to:

$$VHTLTF^{(k)} = [L_1, L_2, \ldots L_{N_{LTF}}] = [Q_{U1}^{(k)}, Q_{U2}^{(k)}]\begin{bmatrix} D_{U1}^{(k)} & 0 \\ 0 & D_{U2}^{(k)} \end{bmatrix}$$
$$\begin{bmatrix} P_{(U1)\_*1} & P_{(U1)\_*2} & \ldots & P_{(U1)\_*N_{LTF}} \\ P_{(U2)\_*1} & P_{(U2)\_*2} & \ldots & P_{(U2)\_*N_{LTF}} \end{bmatrix} S^{(k)}$$

Equation 3 where $Q_{U1}^{(k)}$ corresponds to spatial mapping of the $k^{th}$ tone of a VHT-LTF training field for user 1, $Q_{U2}^{(k)}$ corresponds to spatial mapping of the $k^{th}$ tone of a VHT-LTF training field for user 2, $D_{U1}^{(k)}$ corresponds to a cyclic shift diversity (CSD) phase shift for the $k^{th}$ tone for user 1, $D_{U2}^{(k)}$ corresponds to a cyclic shift diversity (CSD) phase shift for the $k^{th}$ tone for user 2, $P_{(U1)\_*1}, \ldots, P_{(U1)\_*NLTF}$ are columns of the mapping matrix P for user 1, $P_{(U2)\_*1}, \ldots, P_{(U2)\_*NLTF}$ are columns of the mapping matrix P for user 2, and $S^{(k)}$ is the $k^{th}$ tone of a VHT-LTF training symbol.

With continued reference to FIG. 2, according to an embodiment in which the data unit 250 is a two-user data unit, the VHT-SIGB field 268 is, therefore, steered to the two users (assuming that each user does not see interference from the other user). In this case, the single stream of the VHT-SIGB filed 268 is mapped to multiple spatial streams and the multiple users using any column P(U1)_*1, ..., P(U1)_*NLTF or P(U2)_*1, ..., P(U2)_*NLTF of Equation 3. For example, in an embodiment, the first column of the joint P matrix is used to map the VHT-SIGB field 268 for user 1 according to:

$$VHTSIGB_{U1}^{(k)} = Q_{U1}^{(k)} D_{U1}^{(k)} P_{U1\_*1} s_{VHTSIGB\_U1}^{(k)}$$

Equation 4 where $S_{VHTSIGB\_U1}^{(k)}$ is the VHT-SIGB symbol $k^{th}$ tone for user 1. In other embodiments, other columns of the joint P matrix are used to steer the VHT-SIGB field 268 to the intended user via the multiple data streams.

Figure 8:
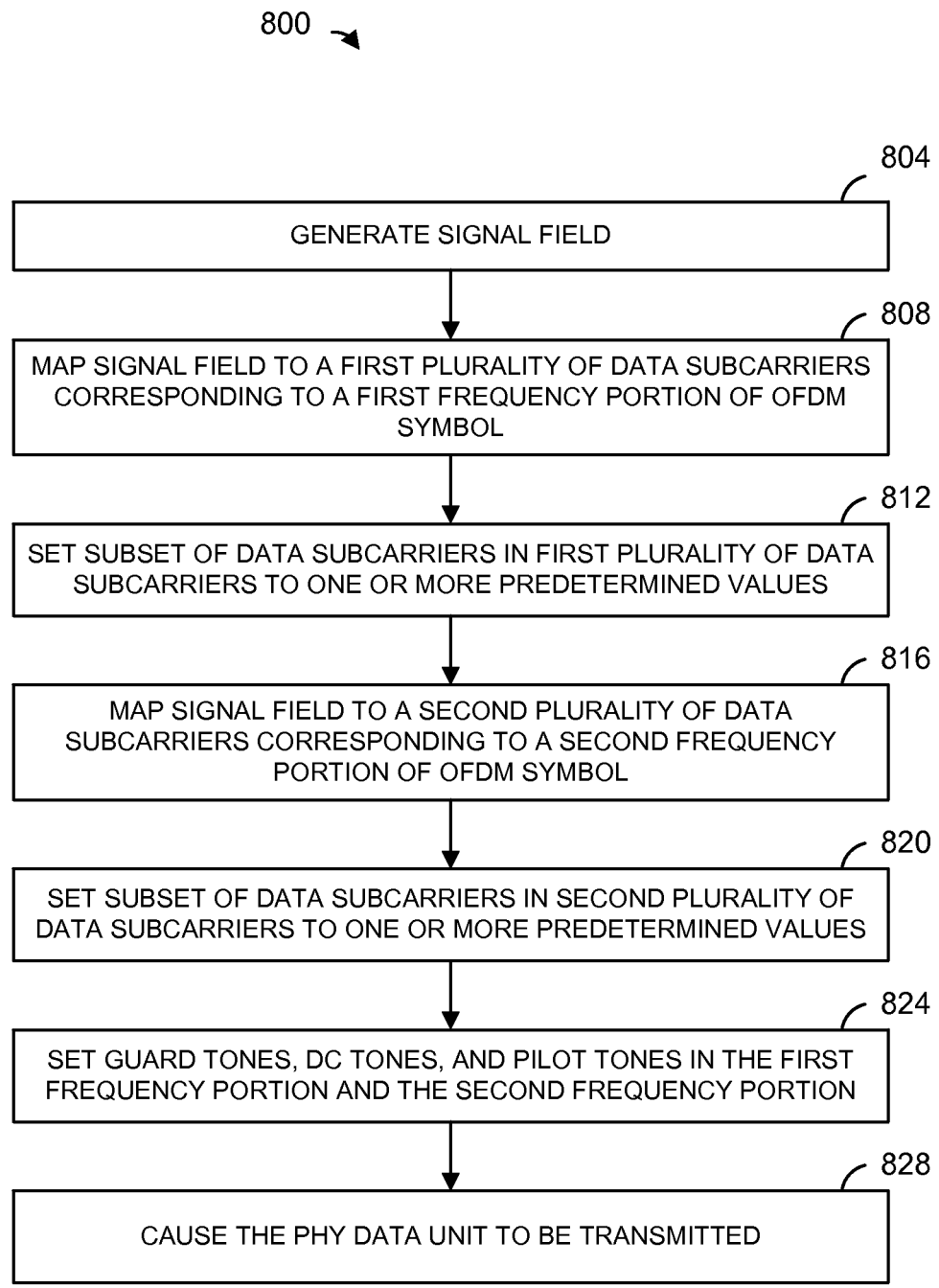
FIG. 8 is a flow diagram of an example method for generating and transmitting a PHY data unit having a signal field, such as a VHT-SIGB or another suitable field, according to an embodiment.

FIG. 8 is a flow diagram of an example method 800 for generating and transmitting a PHY data unit having a signal field, such as a VHT-SIGB or another suitable field, according to an embodiment. The method 800 is implemented at least partially by a PHY processing unit such as the PHY processing unit 20 (FIG. 1), the PHY processing unit 29 (FIG. 1), and/or the PHY processing unit 300 (FIG. 3), and FIG. 8 will be described with reference to FIG. 3 for ease of explanation. In other embodiments, however, another suitable PHY processing unit and/or network interface implements the method 800.

At block 804, a signal field of a preamble of a PHY data unit is generated. In an embodiment, the VHT-SIGB field is generated. In another embodiment, another suitable signal field is generated.

At block 808, the signal field generated at block 804 is mapped to a first plurality of data subcarriers corresponding to a first frequency portion of an OFDM symbol. For example, the BPSK constellation mapping block 306 maps the signal field to a first plurality of data subcarriers corresponding to a first frequency portion of an OFDM symbol. In another embodiment, another suitable processing block of a network interface implements block 808.

At block 812, a set of data subcarriers in the first plurality of data subcarriers are set to predetermined values. For example, in an embodiment, at least some of the subcarriers in the set of subcarriers are set to "+1" value or some other suitable value. As another example, in an embodiment, at least some of the subcarriers in the set of subcarriers are set to "−1" value or some other suitable value. As another example, in an embodiment, at least some of the subcarriers in the set of subcarriers are set to a null value. In an embodiment, the block 812 is implemented by the tone duplications and insertions block 308 in FIG. 3. In another embodiment, another suitable processing block of a network interface implements block 812.

At block 816, the signal field generated at block 804 is mapped to a second plurality of data subcarriers corresponding to a second frequency portion of the OFDM symbol. For example, the tone duplications and insertions block 308 in FIG. 3 maps the signal field to a second plurality of data subcarriers corresponding to the second frequency portion of the OFDM symbol. In another embodiment, another suitable processing block of a network interface implements block 816.

At block 820, a set of data subcarriers in the second plurality of data subcarriers are set to predetermined values. For example, in an embodiment, at least some of the subcarriers in the set of subcarriers are set to "+1" value or some other suitable value. As another example, in an embodiment, at least some of the subcarriers in the set of subcarriers are set to "−1" value or some other suitable value. As another example, in an embodiment, at least some of the subcarriers in the set of subcarriers are set to a null value. In an embodiment, the block 820 is implemented by the tone duplications and insertions block 308 in FIG. 3. In another embodiment, another suitable processing block of a network interface implements block 820.

At block 824, guard tones, DC tones, and/or pilot tones in the first frequency portion and the second frequency portion are set. In an embodiment, the block 824 is implemented at least partially by the VHT pilots generation block 310. In another embodiment, another suitable processing block of a network interface implements block 824.

At block 828, the PHY data unit is transmitted. For example, in an embodiment, a PHY processing unit that implements the method 800 at least partially causes the PHY data unit to be transmitted.

Figure 9:
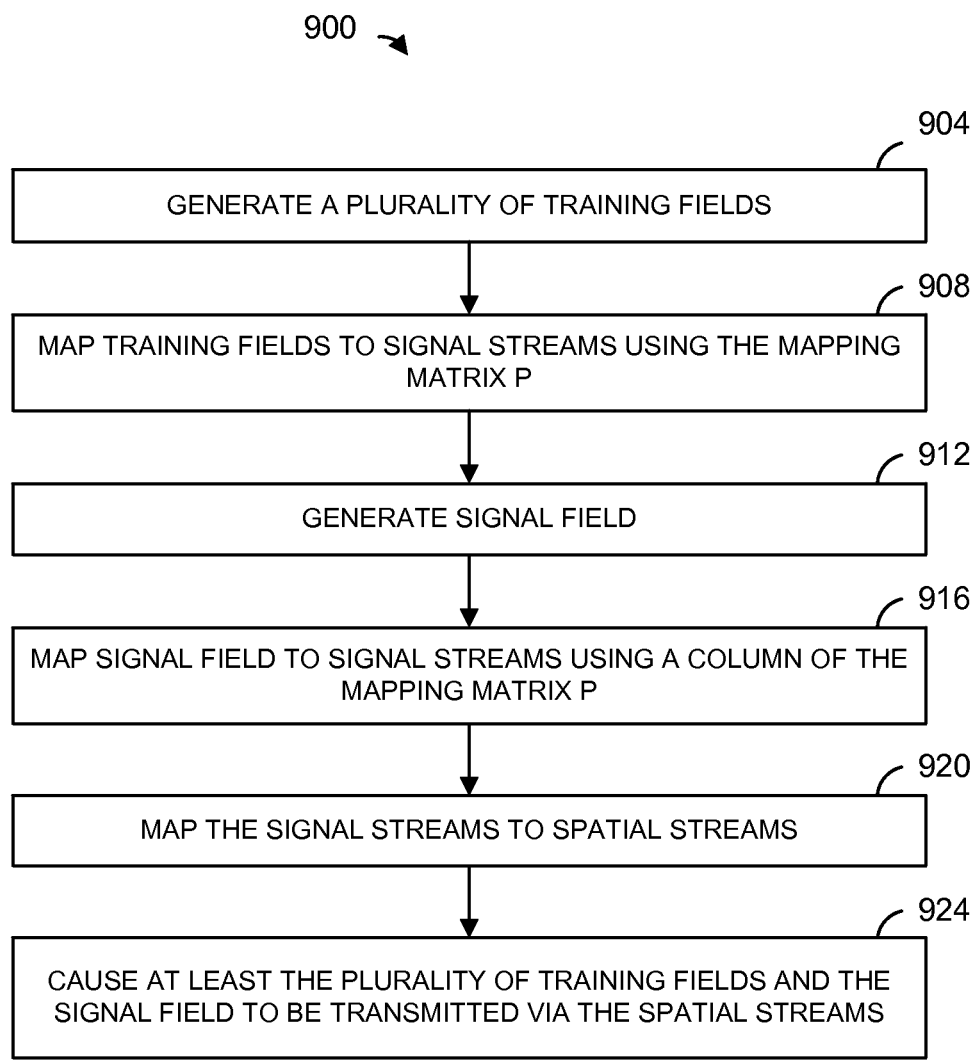
FIG. 9 is a flow diagram of another example method for generating and transmitting a PHY data unit having a signal field, such as a VHT-SIGB or another suitable field, according to another embodiment.

FIG. 9 is a flow diagram of another example method 900 for generating and transmitting a PHY data unit having a signal field, such as a VHT-SIGB or another suitable field, according to an embodiment. The method 900 is implemented at least partially by a PHY processing unit such as the PHY processing unit 20 (FIG. 1), the PHY processing unit 29 (FIG. 1), and/or the PHY processing unit 300 (FIG. 3), and FIG. 9 will be described with reference to FIG. 3 for ease of explanation. In other embodiments, however, another suitable PHY processing unit and/or network interface implements the method 900.

At block 904, a plurality of training fields are generated. For example, in an embodiment, a plurality of VHT-LTF fields are generated, in an embodiment. At block 908, the training fields are mapped to signal streams using a mapping matrix. In an embodiment, the mapping matrix comprises the matrix P discussed above. In other embodiments, other suitable mapping matrices are utilized. In an embodiment, the block 908 is implemented by the mapping block 312. In other embodiments, however, another suitable block of a PHY processing unit and/or a network interface implements block 908.

At block 912, a signal field of a preamble of a PHY data unit is generated. In an embodiment, the VHT-SIGB field is generated. In another embodiment, another suitable signal field is generated. At block 916, the signal field is mapped to a plurality of signal streams using a column of the mapping matrix utilized at block 908. In an embodiment, a column of the matrix P discussed above is utilized. In other embodiments, a column of another suitable mapping matrix is utilized. In an embodiment, the first column of the matrix P is utilized. In other embodiments, a column other than the first column of the matrix P is utilized.

At block 920, the signal streams are mapped to spatial streams. In an embodiment, the signal streams are mapped to spatial streams using the matrix Q discussed above. In other embodiments, other suitable matrices are utilized. In an embodiment, the block 920 is implemented by the spatial mapping block 316. In other embodiments, however, another suitable block of a PHY processing unit and/or a network interface implements block 920.

At block 924, the PHY data unit is transmitted. For example, in an embodiment, a PHY processing unit that implements the method 900 at least partially causes the PHY data unit to be transmitted. Block 924 includes transmitting (or causing to be transmitted) at least i) the plurality of training fields, and ii) the signal field, via the plurality of spatial streams.

Figure 10:
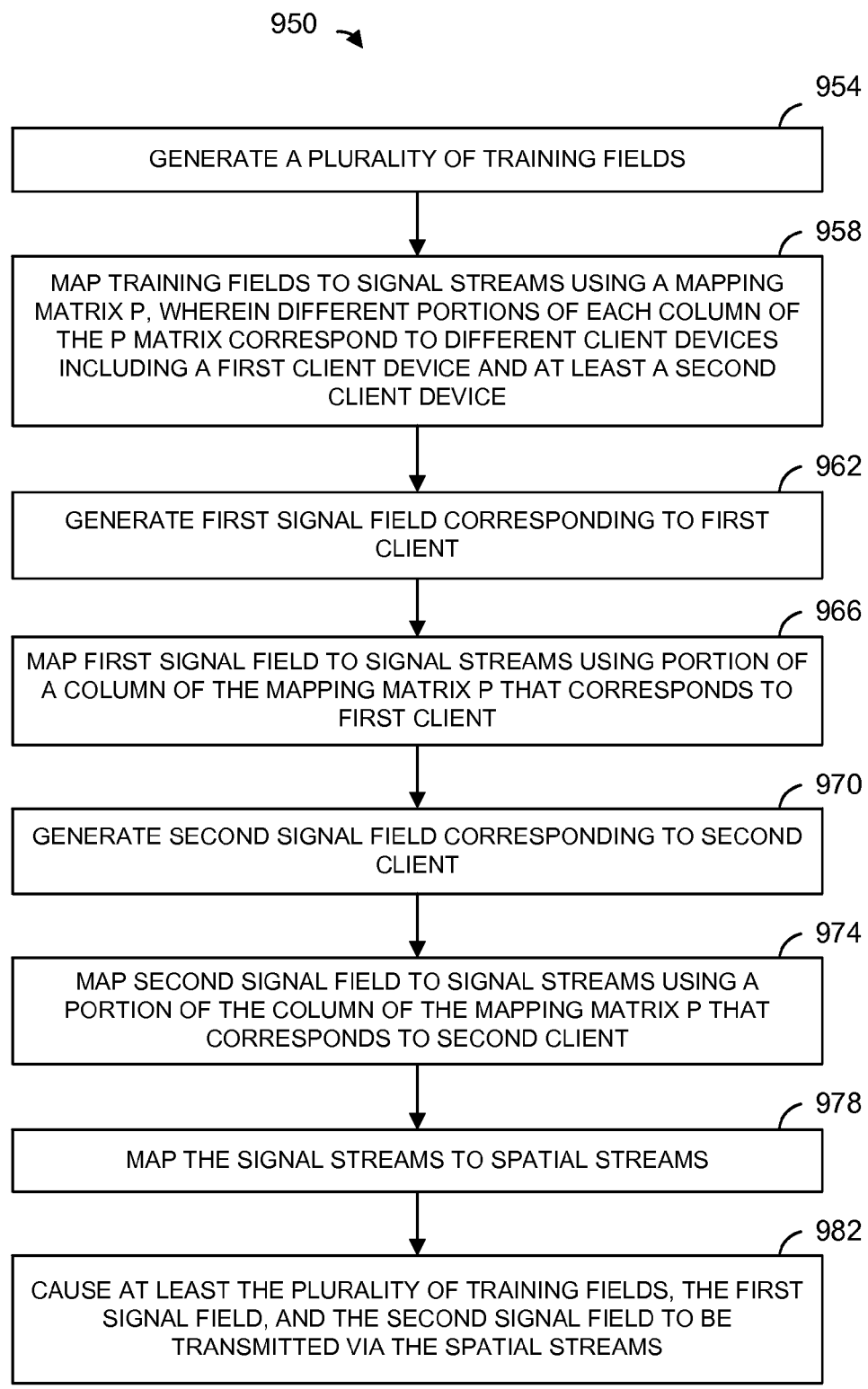
FIG. 10 is a flow diagram of an example method for generating and transmitting a multi-user PHY data unit having a signal field, such as a VHT-SIGB or another suitable field, according to an embodiment.

FIG. 10 is a flow diagram of another example method 950 for generating and transmitting a multi-user PHY data unit having a signal field, such as a VHT-SIGB or another suitable field, according to an embodiment. The method 950 is implemented at least partially by a PHY processing unit such as the PHY processing unit 20 (FIG. 1), the PHY processing unit 29 (FIG. 1), and/or the PHY processing unit 300 (FIG. 3), and FIG. 10 will be described with reference to FIG. 3 for ease of explanation. In other embodiments, however, another suitable PHY processing unit and/or network interface implements the method 950.

At block 954, a plurality of training fields are generated for a multi-user PHY data unit. For example, in an embodiment, a plurality of VHT-LTF fields are generated. At block 958, the training fields are mapped to signal streams using a mapping matrix. In an embodiment, the mapping matrix comprises the giant matrix P discussed above. In other embodiments, other suitable mapping matrices are utilized. In an embodiment, the block 958 is implemented by the mapping block 312. In other embodiments, however, another suitable block of a PHY processing unit and/or a network interface implements block 958.

At block 962, a first signal field of a preamble of the multi-user PHY data unit is generated, wherein the first signal field corresponds to a first client device. In an embodiment, the VHT-SIGB field is generated. In another embodiment, another suitable signal field is generated. At block 966, the first signal field is mapped to a plurality of signal streams using a portion of a column of the mapping matrix utilized at block 958, wherein the portion corresponds to the first client device. In an embodiment, a portion of a column of the giant matrix P discussed above is utilized, wherein the portion corresponds to the first client device. In other embodiments, a portion of a column of another suitable mapping matrix is utilized. In an embodiment, a portion of the first column of the giant matrix P is utilized. In other embodiments, a portion of a column other than the first column of the giant matrix P is utilized.

At block 970, a second signal field of a preamble of the multi-user PHY data unit is generated, wherein the second signal field corresponds to a second client device. In an embodiment, the VHT-SIGB field is generated. In another embodiment, another suitable signal field is generated. At block 974, the second signal field is mapped to a plurality of signal streams using a portion of the column of the mapping matrix utilized at block 958, wherein the portion corresponds to the second client device. In an embodiment, a portion of a column of the giant matrix P discussed above is utilized, wherein the portion corresponds to the second client device. In other embodiments, a portion of a column of another suitable mapping matrix is utilized. In an embodiment, a portion of the first column of the giant matrix P is utilized. In other embodiments, a portion of a column other than the first column of the giant matrix P is utilized. In an embodiment, the same column is utilized in blocks 966 and 974.

At block 978, the signal streams are mapped to spatial streams. In an embodiment, the signal streams are mapped to spatial streams using a matrix Q as discussed above. In other embodiments, other suitable matrices are utilized. In an embodiment, the block 978 is implemented by the spatial mapping block 316. In other embodiments, however, another suitable block of a PHY processing unit and/or a network interface implements block 978.

At block 982, the multi-user PHY data unit is transmitted. For example, in an embodiment, a PHY processing unit that implements the method 950 at least partially causes the PHY data unit to be transmitted. Block 982 includes transmitting (or causing to be transmitted) at least i) the plurality of training fields, ii) the first signal field, and iii) the second signal fieldvia the plurality of spatial streams.

FIG. 11 is a flow diagram of an example method 1000 for generating an OFDM symbol of a PHY data unit, according to an embodiment. The method 1000 is implemented at least partially by a PHY processing unit such as the PHY processing unit 20 (FIG. 1), the PHY processing unit 29 (FIG. 1), and/or the PHY processing unit 300 (FIG. 3), in some embodiments. In other embodiments, other suitable PHY processing units and/or other suitable network interfaces implement the method 1000.

At block 1002, a plurality of information bits is encoded to generate a plurality of coded information bits to be included in an OFDM symbol. The plurality of information bits corresponds to a first bandwidth, and the OFDM symbol includes a number of data subcarriers corresponding to a second bandwidth, the second bandwidth being larger than the first bandwidth. For example, the plurality of information bits corresponds to a base channel bandwidth B, such as a 1 MHz bandwidth, a 2 MHz bandwith, a 4 MHz bandwidth, a 20 MHz bandwidth, a 40 MHz bandwidth, or another suitable base channel bandwidth, and the OFDM symbol includes a number of data tones corresponding to a channel bandwidth that is larger than the base bandwidth, for example an mB bandwidth channel, where m is a suitable integer greater than one, in various embodiments and/or scenarios.

At block 1004, the plurality of coded bits is mapped to a plurality of constellation symbols. At block 1006, the plurality of constellation symbols is mapped to a first plurality of data subcarriers corresponding to a first frequency portion of an OFDM symbol.

At block 1008, a set of one or more data subcarriers in the first plurality of data subcarriers are set to predetermined values. For example, in an embodiment, at least some of the subcarriers in the set of subcarriers are set to "+1" value or some other suitable value. As another example, in an embodiment, at least some of the subcarriers in the set of subcarriers are set to "−1" value or some other suitable value. As another example, in an embodiment, at least some of the subcarriers in the set of subcarriers are set to a null value. In an embodiment, the block 1006 is implemented by the tone duplications and insertions block 308 in FIG. 3. In another embodiment, another suitable processing block of a network interface implements block 1006.

At block 1010, the plurality of constellation symbols is mapped to a second plurality of data subcarriers corresponding to a second frequency portion of the OFDM symbol. For example, the tone duplications and insertions block 308 in FIG. 3 maps the signal field to a second plurality of data subcarriers corresponding to the second frequency portion of the OFDM symbol. In another embodiment, another suitable processing block of a network interface implements block 1010.

At block 1012, a set of one or more data subcarriers in the second plurality of data subcarriers are set to predetermined values. For example, in an embodiment, at least some of the subcarriers in the set of subcarriers are set to "+1" value or some other suitable value. As another example, in an embodiment, at least some of the subcarriers in the set of subcarriers are set to "−1" value or some other suitable value. As another example, in an embodiment, at least some of the subcarriers in the set of subcarriers are set to a null value. In an embodiment, the block 1012 is implemented by the tone duplications and insertions block 308 in FIG. 3. In another embodiment, another suitable processing block of a network interface implements block 1012.

At block 1014, the OFDM symbol is generated to include at least the first plurality of data subcarrers and the second plurality of data subcarriers. In an embodiment, the OFDM symbol is generated to further include one or more of (i) guard tones, (ii) DC tones, and (iii) pilot tones. In an embodiment, the OFDM symbol conforms to a format defined by a short range communciation protocol, such as the IEEE 802.11n Standard or the IEEE 802.11ac Standard, for example. In another embodiment, the OFDM symbol conforms to a communication protocol, such as the IEEE 802.11ah Standard or the IEEE 802.11af Standard, and is a down-clocked version (e.g., with same tone and/or bit allocation) of an OFDM symbol that conforms to a short range communciation protocol. In other embodiments, the OFDM symbol conforms to one or more other suitable communication protocols.

In an embodiment, the OFDM symbol is to be included in a preamble of a data unit. For example, the OFDM symbol corresponds to a signal field or a training field to be included in the preamble, in some embodiments and/or scenarios. In other embodiments and/or scenarios, the OFDM symbol is to be included in a data portion of a data unit.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory, computer readable storage medium or media such as a magnetic disk, an optical disk, a RAM, a ROM, a flash memory, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device, etc.

According to a first embodiment, a method of generating an orthogonal frequency division multiplexing (OFDM) symbol of a data unit to be transmitted via a communication channel includes encoding a plurality of information bits to generate a plurality of coded bits to be included in the OFDM symbol, wherein the plurality of information bits corresponds to a first bandwidth, and wherein the OFDM symbol includes a number of data tones corresponding to a second bandwidth, the second bandwidth larger than the first bandwidth. The method also includes mapping the plurality of coded bits to a plurality constellation symbols and mapping the plurality of constellation symbols to a first plurality of data subcarriers corresponding to a first portion of the OFDM symbol. The method further includes setting a subset of data subcarriers in the first plurality of data subcarriers to one or more predetermined values. The method further still includes mapping the plurality of constellation symbols to a second plurality of data subcarriers corresponding to a second portion of the OFDM symbol, and setting a subset of data subcarriers in the second plurality of data subcarriers to one or more predetermined values. The method additionally includes generating the OFDM symbol to include at least the first plurality of data subcarriers and the second plurality of data subcarriers.

In other embodiments, the method includes any combination of one or more of the following features.

Setting the subset of data subcarriers in the first plurality of data subcarriers to one or more predetermined values comprises setting at least one data subcarrier in the subset of data subcarriers in the first plurality of data subcarriers to a null value.

Setting the subset of data subcarriers in the second plurality of data subcarriers to one or more predetermined values comprises setting at least one data subcarrier in the subset of data subcarriers in the second plurality of data subcarriers to the null value.

Setting the subset of data subcarriers in the first plurality of data subcarriers to one or more predetermined values comprises setting at least one data subcarrier in the subset of data subcarriers in the first plurality of data subcarriers to a non-zero value.

Setting the subset of data subcarriers in the second plurality of data subcarriers to one or more predetermined values comprises setting at least one data subcarrier in the subset of data subcarriers in the second plurality of data subcarriers to the non-zero value.

The method further comprises mapping the plurality of constellation symbols to a third plurality of data subcarriers corresponding to a third portion of the OFDM symbol, setting a subset of data subcarriers in the third plurality of data subcarriers to one or more predetermined values.

Generating the OFDM symbol further comprises including the third plurality of data subcarriers in the OFDM symbol.

The method further comprises generating a preamble of a physical layer (PHY) data unit, wherein the preamble includes the OFDM symbol.

The method further comprises generating a data portion of a physical layer (PHY) data unit, wherein the data portion includes the OFDM symbol.

The method further comprises (i) inserting one or more additional bits into the plurality of information bits and (ii) duplicating the plurality of information bits and the additional bits, prior to encoding the information bits, to generate a plurality of duplicated bits, wherein encoding the information bits comprises encoding the plurality of duplicated bits.

The first bandwidth corresponds to a bandwidth B and the second bandwidth corresponds to a bandwidth mB, wherein m is an integer.

In another embodiment, an apparatus comprises a network interface configured to encode a plurality of information bits to generate a plurality of coded bits to be included in an OFDM symbol, wherein the plurality of information bits corresponds to a first bandwidth, and wherein the OFDM symbol includes a number of data tones corresponding to a second bandwidth, the second bandwidth larger than the first bandwidth. The network interface is also configured to map the plurality of coded bits to a plurality constellation symbols, and map the plurality of constellation symbols to a first plurality of data subcarriers corresponding to a first portion of the OFDM symbol. The network interface is also configured to set a subset of data subcarriers in the first plurality of data subcarriers to one or more predetermined values. The network interface is further still configured to map the plurality of constellation symbols to a second plurality of data subcarriers corresponding to a second portion of the OFDM symbol, and set a subset of data subcarriers in the second plurality of data subcarriers to one or more predetermined values. The network interface is additionally configured to generate the OFDM symbol to include at least the data subcarriers corresponding to the first potion and the data subcarriers corresponding to the second portion.

In other embodiment, the apparatus includes any combination of one or more of the following features.

The network interface is further configured to include, in the OFDM symbol, one or more of (i) guard tones, (ii) direct current (DC) tones and (iii) pilot tones.

Setting the subset of data subcarriers in the first plurality of data subcarriers to one or more predetermined values comprises setting at least one data subcarrier in the subset of data subcarriers in the first plurality of data subcarriers to a null value.

Setting the subset of data subcarriers in the second plurality of data subcarriers to one or more predetermined values comprises setting at least one data subcarrier in the subset of data subcarriers in the second plurality of data subcarriers to the null value.

Setting the subset of data subcarriers in the first plurality of data subcarriers to one or more predetermined values comprises setting at least one data subcarrier in the subset of data subcarriers in the first plurality of data subcarriers to a non-zero value.

Setting the subset of data subcarriers in the second plurality of data subcarriers to one or more predetermined values comprises setting at least one data subcarrier in the subset of data subcarriers in the second plurality of data subcarriers to the non-zero value.

The network interface is further configured to map the plurality of constellation symbols to a third plurality of data subcarriers corresponding to a third portion of the OFDM symbol, map a subset of data subcarriers in the third plurality of data subcarriers to one or more predetermined values; and generate the OFDM symbol to further include the third plurality of data subcarriers.

The network interface is further configured to generate a preamble of a physical layer (PHY) data unit, wherein the preamble includes the OFDM symbol.

The network interface is further configured to generate a data portion of a physical layer (PHY) data unit, wherein the data portion includes the OFDM symbol.

The network interface is further configured to insert one or more additional bits into the plurality of information bits; and duplicate the plurality of information bits and the additional bits, prior to encoding the information bits, to generate a plurality of duplicated bits, wherein encoding the information bits comprises encoding the plurality of duplicated bits.

The first bandwidth corresponds to a bandwidth B and the second bandwidth corresponds to a bandwidth mB, wherein m is an integer.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of generating a multi-user physical layer (PHY) data unit for transmission via a communication channel, the method comprising:

generating, at a communication device, a first preamble portion of the multi-user PHY data unit;

generating, at the communication device, a plurality of training fields of the multi-user PHY data unit for transmission after the first preamble portion;

generating, at the communication device, a second preamble portion of the multi-user PHY data unit for transmission after the plurality of training fields, including:

encoding a plurality of information bits to generate a plurality of coded bits to be included in an orthogonal frequency division multiplexing (OFDM) symbol of the second preamble portion, wherein the plurality of information bits corresponds to a first bandwidth, and wherein the OFDM symbol includes a number of data tones corresponding to a second bandwidth, the second bandwidth larger than the first bandwidth, mapping the plurality of coded bits to a plurality constellation symbols, mapping the plurality of constellation symbols to a first plurality of data subcarriers corresponding to a first portion of the OFDM symbol, mapping the plurality of constellation symbols to a second plurality of data subcarriers corresponding to a second portion of the OFDM symbol, and generating the OFDM symbol to include at least the first plurality of data subcarriers and the second plurality of data subcarriers;

generating, at the communication device, a data portion of the multi-user PHY data unit for transmission after the second preamble portion, wherein a number of guard tones, direct current (DC) tones, and pilot tones in the second preamble portion is equal to a number of guard tones, DC tones, and pilot tones in the data portion of the multi-user PHY data unit; and transmitting, by the communication device, the multi-user PHY data unit.

2. The method of claim 1, wherein generating the second preamble portion further includes:
setting a subset of data subcarriers in the first plurality of data subcarriers to one or more predetermined values; and
setting a subset of data subcarriers in the second plurality of data subcarriers to one or more predetermined values.

3. The method of claim 2, wherein setting the subset of data subcarriers in the first plurality of data subcarriers to one or more predetermined values comprises setting at least one data subcarrier in the subset of data subcarriers in the first plurality of data subcarriers to a null value; and
wherein setting the subset of data subcarriers in the second plurality of data subcarriers to one or more predetermined values comprises setting at least one data subcarrier in the subset of data subcarriers in the second plurality of data subcarriers to the null value.

4. The method of claim 2, wherein setting the subset of data subcarriers in the first plurality of data subcarriers to one or more predetermined values comprises setting at least one data subcarrier in the subset of data subcarriers in the first plurality of data subcarriers to a non-zero value; and
wherein setting the subset of data subcarriers in the second plurality of data subcarriers to one or more predetermined values comprises setting at least one data subcarrier in the subset of data subcarriers in the second plurality of data subcarriers to the non-zero value.

5. The method of claim 1, further comprising:
mapping the plurality of constellation symbols to a third plurality of data subcarriers corresponding to a third portion of the OFDM symbol; and
wherein generating the OFDM symbol further comprises including the third plurality of data subcarriers in the OFDM symbol.

6. The method of claim 1, further comprising (i) inserting one or more additional bits into the plurality of information bits and (ii) duplicating the plurality of information bits and the additional bits, prior to encoding the information bits, to generate a plurality of duplicated bits; and
wherein encoding the information bits comprises encoding the plurality of duplicated bits.

7. The method of claim 1, wherein the first bandwidth corresponds to a bandwidth B and the second bandwidth corresponds to a bandwidth mB, wherein m is a positive integer.

8. The method of claim 7, wherein the bandwidth B is 20 MHz.

9. The method of claim 7, wherein the bandwidth B is less than 20 MHz.

10. The method of claim 9, wherein the bandwidth B is one of: 1 MHz, 2 MHz, and 4 MHz.

11. An apparatus, comprising:
a network interface device implemented on one or more integrated circuit (IC) devices, the network interface device including:
a media access control layer (MAC) processor implemented on the one or more IC devices, and
a physical layer (PHY) processor implemented on the one or more IC devices;

wherein the PHY processor is configured to:
generate a first preamble portion of a multi-user physical layer (PHY) data unit, the multi-user PHY data unit for transmission via a communication channel,
generate a plurality of training fields of the multi-user PHY data unit for transmission after the first preamble portion, and
generate a second preamble portion of the multi-user PHY data unit for transmission after the plurality of training fields, including:
encoding a plurality of information bits to generate a plurality of coded bits to be included in an orthogonal frequency division multiplexing (OFDM) symbol of the second preamble portion, wherein the plurality of information bits corresponds to a first bandwidth, and wherein the OFDM symbol includes a number of data tones corresponding to a second bandwidth, the second bandwidth larger than the first bandwidth,
mapping the plurality of coded bits to a plurality constellation symbols,
mapping the plurality of constellation symbols to a first plurality of data subcarriers corresponding to a first portion of the OFDM symbol,
mapping the plurality of constellation symbols to a second plurality of data subcarriers corresponding to a second portion of the OFDM symbol, and
generating the OFDM symbol to include at least the first plurality of data subcarriers and the second plurality of data subcarriers;
wherein the PHY processor is further configured to generate a data portion of the multi-user PHY data unit for transmission after the second preamble portion, wherein a number of guard tones, direct current (DC) tones, and pilot tones in the second preamble portion is equal to a number of guard tones, DC tones, and pilot tones in the data portion of the multi-user PHY data unit.

12. The apparatus of claim 11, wherein the PHY processor is further configured to:
set a subset of data subcarriers in the first plurality of data subcarriers to one or more predetermined values; and
set a subset of data subcarriers in the second plurality of data subcarriers to one or more predetermined values.

13. The apparatus of claim 12, wherein the PHY processor is configured to:
set at least one data subcarrier in the subset of data subcarriers in the first plurality of data subcarriers to a null value; and
set at least one data subcarrier in the subset of data subcarriers in the second plurality of data subcarriers to the null value.

14. The apparatus of claim 12, wherein the PHY processor is configured to:
set at least one data subcarrier in the subset of data subcarriers in the first plurality of data subcarriers to a non-zero value; and
set at least one data subcarrier in the subset of data subcarriers in the second plurality of data subcarriers to the non-zero value.

15. The apparatus of claim 11, wherein the PHY processor is further configured to:
map the plurality of constellation symbols to a third plurality of data subcarriers corresponding to a third portion of the OFDM symbol; and
include the third plurality of data subcarriers in the OFDM symbol.

16. The apparatus of claim 11, wherein the PHY processor is further configured to:
   insert one or more additional bits into the plurality of information bits; and
   duplicate the plurality of information bits and the additional bits, prior to encoding the information bits, to generate a plurality of duplicated bits; and
   wherein encoding the information bits comprises encoding the plurality of duplicated bits.

17. The apparatus of claim 11, wherein the first bandwidth corresponds to a bandwidth B and the second bandwidth corresponds to a bandwidth mB, wherein m is a positive integer.

18. The apparatus of claim 17, wherein the bandwidth B is 20 MHz.

19. The apparatus of claim 17, wherein PHY processor includes:
   a plurality of transceivers.

20. The apparatus of claim 19, further comprising:
   a plurality of antennas coupled to the plurality of transceivers.

\* \* \* \* \*